United States Patent
Kobayashi

(10) Patent No.: US 7,627,690 B2
(45) Date of Patent: Dec. 1, 2009

(54) DATA GENERATING DEVICE

(75) Inventor: Naofumi Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 790 days.

(21) Appl. No.: 10/771,724

(22) Filed: Feb. 4, 2004

(65) Prior Publication Data

US 2004/0158872 A1 Aug. 12, 2004

(30) Foreign Application Priority Data

Feb. 6, 2003 (JP) ............................. 2003-029355

(51) Int. Cl.
*G06F 15/173* (2006.01)
(52) U.S. Cl. ....................................... 709/238
(58) Field of Classification Search ................ 709/238, 709/230, 223
See application file for complete search history.

(56) References Cited

U.S. PATENT DOCUMENTS

| | | | | |
|---|---|---|---|---|
| 6,085,235 A * | 7/2000 | Clarke et al. ................ | 709/219 |
| 6,728,775 B1 * | 4/2004 | Chaddha ..................... | 709/231 |
| 6,785,294 B1 * | 8/2004 | Ammitzbøll et al. ......... | 370/467 |
| 6,874,010 B1 * | 3/2005 | Sargent ...................... | 709/203 |
| 6,891,830 B2 * | 5/2005 | Curtis ........................ | 370/392 |
| 6,934,759 B2 * | 8/2005 | Hejna, Jr. ................... | 709/231 |
| 6,957,277 B2 * | 10/2005 | Yagyu et al. ................ | 709/245 |
| 6,965,916 B1 * | 11/2005 | Kling et al. ................. | 709/205 |
| 7,043,528 B2 * | 5/2006 | Schmitt et al. .............. | 709/204 |
| 7,082,142 B1 * | 7/2006 | Begeja ....................... | 370/507 |
| 7,161,934 B2 * | 1/2007 | Buchsbaum et al. ........ | 370/382 |
| 7,185,352 B2 * | 2/2007 | Hallford et al. ............. | 725/28 |
| 7,194,549 B1 * | 3/2007 | Lee et al. ................... | 709/238 |
| 7,254,138 B2 * | 8/2007 | Sandstrom .................. | 370/412 |
| 7,284,064 B1 * | 10/2007 | Connelly .................... | 709/231 |
| 7,366,780 B2 * | 4/2008 | Keller et al. ................ | 709/227 |
| 7,369,567 B2 * | 5/2008 | Newberg et al. ............ | 370/432 |
| 7,383,345 B2 * | 6/2008 | Cinghita et al. ............. | 709/231 |
| 7,400,645 B2 * | 7/2008 | Tsuchiya et al. ............ | 370/466 |
| 7,450,580 B2 * | 11/2008 | Itonaga et al. .............. | 370/392 |

FOREIGN PATENT DOCUMENTS

JP 2002-064558 2/2002
JP 2002185528 6/2002

OTHER PUBLICATIONS

B. Cain et al. Internet Group Management Protocol, Version 3. Network Working Group. pp. 1-53 Oct. 2002.
R. Vida et al. Multicast Listener Discovery Version 2 (MLDv2) for Ipv6. Internet Draft Obsoletes RFC 2710 pp. 1-50 Nov. 2002.
Notice of Reason for Rejection dated Oct. 23, 2007, for the corresponding Japanese Patent Application JP 2003-029355 with translation.

* cited by examiner

*Primary Examiner*—David Y Eng
(74) *Attorney, Agent, or Firm*—Katten Muchin Rosenman LLP

(57) ABSTRACT

A data generating device is installed more upstream than a switching device for switching based on data of a first layer. The data generating device reads forward management information relating to a forwarding process of forward data from data of a second layer higher than the first layer, determines one or more clients corresponding to destinations of the forward data on the basis of the forward management information, and generates the same number of pieces of transmission data as the number of identified clients, and forwards each of the pieces of transmission data to the switching device in order to transmit the transmission data to each of the clients.

19 Claims, 29 Drawing Sheets

FIG. 2
PRIOR ART

| CLASS-D ADDRESS | | APPLICATION |
|---|---|---|
| 224.0.0.0 | | RESERVED |
| | 224.0.0.1~224.0.0.255<br>224.0.0.1-ALL-SYSTEMS<br>224.0.0.2-ALL-ROUTERS<br>224.0.0.4-DVMRP ROUTERS<br>224.0.0.5-OSFP-ALL<br>...  | ASSIGNMENT FOR ROUTING PROTOCOL ETC. |
| | 224.0.1.0~238.255.255.255<br>224.0.1.7-AUDIO NEWS<br>224.0.1.11-VOICE OF IETF MEETING<br>224.0.1.12-VIDEO OF IETF MEETING<br>224.0.1.16-MUSIC SERVICE<br>... | ASSIGNMENT FOR PUBLIC USE |
| 239.0.0.0~239.255.255.255 | | ASSIGNMENT FOR LOCAL SITE |

LEAVING FROM IGMPV2 MULTICAST GROUP

PARTICIPATION IN IGMPV2 MULTICAST GROUP

LEAVING FROM IGMPV3 MULTICAST GROUP

PARTICIPATION IN IGMPV3 MULTICAST GROUP

FIG. 9
PRIOR ART
RFC 1112
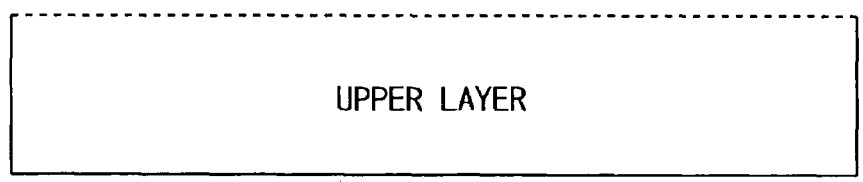
------IP SERVICE INTERFACE------
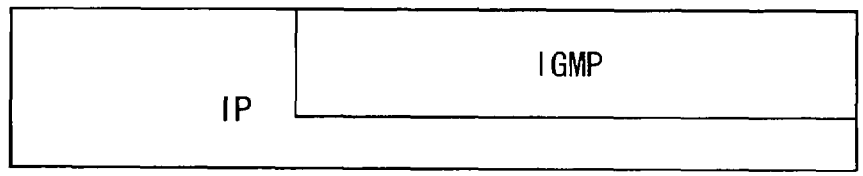
------LOCAL NETWORK SERVICE INTERFACE------
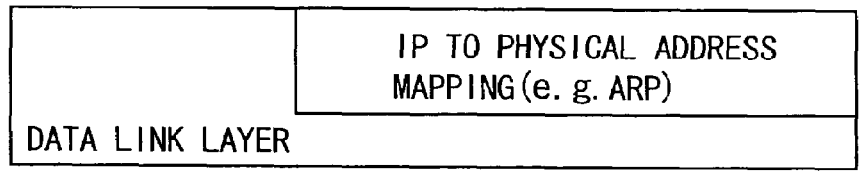

FIG. 15

| ENTRY NUMBER | CLIENT ADDRESS | CLIENT MAC ADDRESS | MULTICAST ADDRESS | SOURCE ADDRESS | FILTER MODE |
|---|---|---|---|---|---|
| 1 | 210.23.171.aa | xx:xx:xx:xx:12:34 | 238.0.0.123 | 61.143.221.2 | INCLUDE |
|   |               |                    |             | 61.143.221.3 |         |
|   |               |                    |             | 61.143.221.4 |         |
| 2 | 210.23.171.bb | xx:xx:xx:xx:56:78 | 238.28.0.33 | 201.67.113.65 | INCLUDE |
|   |               |                    | 238.225.13.33 | 211.67.0.3 | EXCLUDE |
|   |               |                    |             | 211.67.0.5 |         |
| 3 | 210.23.171.cc | xx:xx:xx:xx:90:12 | 239.128.0.23 | 174.67.119.68 | INCLUDE |
| 4 | 210.23.171.dd | xx:xx:xx:xx:34:56 | 238.0.0.123 | 61.143.221.2 | EXCLUDE |
|   |               |                    |             | 61.143.221.5 |         |
|   |               |                    |             | 61.143.221.6 |         |
|   |               |                    | 239.12.67.192 | 198.12.57.227 | EXCLUDE |
|   |               |                    |             | 198.12.57.238 |         |
| 5 | 210.23.171.ee | xx:xx:xx:xx:78:90 | 238.125.65.1 | 172.0.12.5 | EXCLUDE |
| 6 | 210.23.171.ff | xx:xx:xx:xx:01:23 | 239.128.0.123 | 61.143.221.2 | INCLUDE |
|   |               |                    |             | 61.143.221.3 |         |
|   |               |                    |             | 61.143.221.5 |         |

24A

IGMP MESSAGE FORMAT

MLDV2 MESSAGE FORMAT

IPV6 HEADER FORMAT (RFC2460)

IGMPV3 REPORT MESSAGE FORMAT

MLDV2 REPORT MESSAGE FORMAT

FIG. 22

| ENTRY NUMBER | CLIENT ADDRESS | CLIENT MAC ADDRESS | MULTICAST ADDRESS | SOURCE ADDRESS | FILTER MODE |
|---|---|---|---|---|---|
| ... | ... | ... | ... | ... | ... |
| 7 | 210.23.171.gg | xx:xx:xx:xx:45:67 | 238.0.2.222 | 61.143.221.38 | INCLUDE |

| ENTRY NUMBER | CLIENT ADDRESS | CLIENT MAC ADDRESS | MULTICAST ADDRESS | SOURCE ADDRESS | FILTER MODE |
|---|---|---|---|---|---|
| 1 | 210.23.171.aa | xx:xx:xx:xx:12:34 | 238.0.0.123 | 61.143.221.2 | EXCLUDE |
| | | | 238.28.0.33 | 201.67.113.65 | INCLUDE |
| ... | ... | ... | ... | ... | ... |

USER MANAGEMENT TABLE ~46

| USER NAME | USER ADDRESS (CLIENT ADDRESS) | RECEIPT CONTENT ADDRESS (MULTICAST ADDRESS) | RECEPTION STARTING TIME | RECEPTION ENDING TIME |
|---|---|---|---|---|
| A | xxx.xx.x.111 | 238.0.a.aaa | T11 | T12 |
|   |   | 238.0.a.bbb | T13 | T14 |
| B | xxx.xx.x.112 | 238.0.a.bbb | T21 | T22 |
| C | xxx.xx.x.113 | 238.0.a.aaa | T31 | T32 |
|   |   | 238.0.a.bbb | T33 | T34 |
|   |   | 238.0.a.ccc | T35 | T36 |
| ... | ... | ... | ... | ... |
| Y | xxx.xx.x.124 | 238.0.a.aaa | T241 | T242 |
| Z | xxx.xx.x.125 | 238.0.a.bbb | T251 | T252 |

DATA GENERATING DEVICE

BACKGROUND OF THE INVENTION

The invention relates to a device for efficiently distributing data for multicasting in a multicast environment.

The multicast has hitherto been utilized as a technology of scheming to make efficient a transmission of streaming data, etc. including multimedia data such as voices, sounds, videos, images, these combination and so on. In the multicast, it is basically impossible to provide an on-demand data distribution. The multicast has, however, a large number of merits in a distribution of the dynamic images and a distribution of the voices in realtime (Example: live relay broadcasting).

In the multicast, a quantity of traffic of a certain route is kept constant at all times irrespective of the number of clients (the number of users desiring to receive data). Hence, there is a less of influence exerted on other communications. Accordingly, in the multicast, unlike unicast, there is no necessity of providing equipment such as a dedicated-to-distribution network and cache server, and the like. According to the multicast, the multimedia data can be distributed based on an extremely low-cost network structure.

Technologies for actualizing the multicast are Internet Group Management Protocol (IGMP) and a multicast routing protocol. The IGMP is a protocol for a multicast-supported router and a multicast-supported layer-3 switch (which will hereinafter be called "multicast routers") to grasp multicast receiving states of the clients (an end system) each connected under the multicast router. The multicast routing protocol is a protocol that functions between the multicast routers in order to build up a data distribution route from the server down to each client. Note that, in the specification, "layer 2" and "layer 3" respectively mean communication functions defined on OSI (Open System Interconnection) layer model.

In conventional IGMP version 1 (IGMPv1) and IGMP version 2 (IGMPv2), a multicast group is managed by only multicast addresses corresponding to destination addresses of the multicast data. Note that there is a system capable of restricting a transmission host in IP multicast communications supported by the IGMPv2 messages (see "Patent document 1").

In IGMP version 3 (IGMPv3: See non-patent document 2), however, a multicast session is identified and managed by an address (source address) of a server (source) as a data transmission source and by the multicast address. Namely, the multicast session where the source address, though the multicast address is the same, is different is recognized as a different multicast session. Accordingly, in the IGMPv3, a dual use of the multicast address becomes possible. This form of multicast is called SSM (Source Specific Multicast) and will be, it is predicted, applied to realtime broadcasting from now onwards.

Further, normally in a local area network (LAN) environment and in a broadband environment for accessing the Internet, a layer-2 switch (a LAN switch) is installed between the router or the layer-3 switch and the client. Then, this layer-2 switch accommodates the end system (clients) and is connected to the router or the layer-3 switch.

The layer-2 switch used in a network utilizing the multicast generally implements an IGMP Snooping function. In the IGMP Snooping, the multicast data are forwarded to only a port to which a client (a receiver) desiring to receive the multicast data is connected. In the IGMP Snooping, the layer-2 switch snoops to see (refers to) the IGMP messages sent from the client and the multicast router. Then, the layer-2 switch grasps a port where the multicast router was connected, each port where each client was connected, and each multicast address which each client expects reception of multicast data, and then forwards the multicast data based on the result of the grasp.

Thus, the IGMP Snooping enables the multicast data to be forwarded to only the port required. Therefore, it is avoided that the multicast data arrive at all the clients including the clients who do not desire to receive. At this time, the layer-2 switch supporting the IGMP Snooping judges whether layer-2 information, i.e., a media access control (MAC) address comes under the multicast address or not. Then, in case the MAC address is the multicast address, the layer-2 switch forwards the multicast data to only the port required.

Thus, the layer-2 switch actualizes the IGMP function by the IGMP snooping. Namely, the IGMP and the Internet Protocol (IP) multicast are functions of the layer 3, however, the layer-2 switch controls the forwarding process based on the layer-2 information. Accordingly, the layer-2 switch, even if supporting the IGMP Snooping, has no necessity of executing processes related to the layer 3 and did not therefore undergo a great adverse influence upon its performance.

Above-mentioned the Patent Document 1 and the non-Patent Documents 1 and 2 are as follows.

[Patent document 1] Japanese Patent laying-open Application Publication No.2002-64558;

[Non-patent document 1] "Multicast Listener Discovery Version 2 (MLDv2) for IPv6", [online], Internet <URL:http://www.ietf.org/internet-drafts/draft-vida-mld-v2-06.txt>; and

[Non-patent document 2] "Internet Group Management Protocol, Version 3", [online], Internet <URL: http://www.ietf.org/rfc/rfc3376.txt? number=337>

In the IGMPv3 and Multicast Listener Discovery version 2 (MLDv2: see the non-patent document 1) which will be, it is predicted, spread from now onwards, however, the processing at a layer-2 level becomes impossible unlike conventional IGMPs (version 1, version 2) and MLD (version 1). Herein, the MLD is a technology on the IPv6 corresponding to the IGMP on the IPv4. In the IGMPv3 and the MLDv2, source information and a plurality of multicast addresses, etc. are stored in a payload field next to an IP header in an IP packet. These pieces of information are indispensable for actualizing functions of the IGMPv3 and the MLDv2. It is therefore impossible that the IGMP Snooping of the layer-2 switch realizes functions of the IGMPv3 and the MLDv2. Namely, for actualizing the functions of the IGMPv3 and the MLDv2 by utilizing the IGMP Snooping, the layer-2 switch is required to refer to layer-3 information in an IGMP packet or MLDv2 packet. The actualization of the functions of the IGMPv3 and the MLDv2 by utilizing the IGMP Snooping, the layer-2switch is further required to determine a port as a forward destination after referring to the layer-3information even in an actual forwarding process.

The layer-2 switch for switching a frame on the basis of the layer-2 (MAC) information implements the process of referring to the layer-3 information, which causes a remarkable decline of performance of the layer-2 switch, causes the device itself to be extremely complicated and causes its cost to rise. Further, it is the same as a state where the clients are connected by a shared media (a hub (HUB), etc.) that a network is configured by the layer-2 switches incapable of actualizing the IGMP Snooping. Namely, the multicast data are forwarded to even the client having no necessity of receiving the multicast data, and an adverse influence is exerted on other unicast communications and multicast communications. Hence, it follows that there is lost a merit given from the layer-2 switch accommodating the clients.

SUMMARY OF THE INVENTION

One of objects of the invention is that providing a system and device, in a network which is used a multicast group management protocol (e.g. IGMPv3 and/or MLDv2) using information for a certain layer (e.g. layer-3 information), for distributing multicast data to only ports connected clients, each. which desires reception of the multicast data, via a switch based on a layer (e.g. layer-2) lower than the certain layer.

To solve the problems, the invention takes the following constructions. A first aspect of the invention is a data generating device installed on an upstream side of a switching device for performing switching based on data of a first layer. The data generating device comprises a reading unit reading forward management information relating to a forwarding process of forward data from data of a second layer higher than the first layer, a storage unit storing the forward management information read by the reading unit, a data generating unit identifying one or more clients, each of which becomes (corresponds to) a forward destination of the forward data on the basis of the forward management information stored on the storage unit, and generating the same number of pieces of transmission data including equivalent contents to the forward data as the number of identified clients, and a forwarding unit forwarding the transmission data generated by the data generating unit to the switching device in order to transmit the transmission data to the respective clients.

In the first aspect of the invention, the reading unit reads the forward management information about the forwarding process of the forward data, from data of a layer higher than other layer of data that is referred by the switching device installed on a downstream side of the data generating device when performs switching. For instance, if the switching device installed downstream of the data generating device is a layer-2 switch, the reading unit reads the forward management information from the data of the layer 3 or higher such as a message of the IGMPv3, a message of the MLDv2, and the like.

The storage unit stores the information based on the forward management information read by the reading unit. The storage unit may store intactly the forward management information read by the reading unit and may also store information created based on the forward management information by other means (e.g., managing unit).

The data generating unit determines, based on the forward management information, one or more devices (clients), each of which becomes (corresponds to) a forward destination of the forward data. The data generating unit generates the same number of pieces of unicast data as the number of identified clients. For example, the data generating unit copies and changes the forward data so that one piece of data is transmitted to the single client corresponding to the forward destination. The data generating unit copies the forward data in order to generate the same number of pieces of data as the number of clients corresponding to the forward destinations. Then, the data generating unit changes a destination address of the copied data into an address of the client corresponding to the forward destination.

Therefore, according to the first aspect of the invention, based on the forward management information, the transmission data having equivalent contents to the forward data are transmitted to each of the clients corresponding to the forward destination of the forward data (namely, the forward data are substantially transmitted to each client with a one-to-one transmission). Hence, the switching device installed downstream of the data generating device has no necessity of executing the process based on the forward management information with respect to the forward data. Namely, the switching device has no necessity of reading (referring to) the information (the forward management information) of the higher-order layer. Accordingly, it is possible to reduce a delay in processing due to the switching device's reading the information of the higher-order layer and a cost for thus designing the switching device.

A second aspect of the invention is a data generating device comprising a reading unit reading information on a forwarding process of multicast data from data of a layer higher than a layer 2 defined in OSI layer model (OSI reference model), a storage unit storing forward management information based on the information read by the reading unit, and a data generating unit identifying one or more clients, each of which corresponds to a forward destination, and generating the same number of pieces of unicast data as the number of identified clients from the multicast data. The data generating unit, for example, copies, based on the forward management information stored on the storage unit, the multicast data by the same number of pieces of data as the number of clients corresponding to the forward destinations, and changing each piece of copied data into unicast data.

The data generating unit may be constructed to generate the unicast data by rewriting a MAC address of each piece of copied data into a MAC address of each client corresponding to the forward destination.

Moreover, the second aspect of the invention may take such a construction that there is further included a sending unit sending the data toward a downstream side of the data generating device, and the sending unit sends the unicast data generated by the data generating unit and the multicast data.

Further, the second aspect of the invention may take such a construction that there is further included a managing unit updating the forward management information stored on the storage unit on the basis of the information read by the reading unit.

Still further, the second aspect of the invention may take such a construction that in case the information read by the reading unit is information indicating a participation in a multicast group, the managing unit has contents of the piece of information reflected in the forward management information stored on the storage unit.

Yet further, the second aspect of the invention may take such a construction that in case the information read by the reading unit is information that indicates leaving from the multicast group, the managing unit deletes information about the client as a sender of the piece of information from the forward management information.

Moreover, the second aspect of the invention may take such a construction that there is further included a time measuring unit for measuring a fixed period of time, and, in case the time measuring unit judges that a response to a response request is not received for the fixed period of time or longer from the client, the managing unit deletes information about this client from the forward management information.

Still moreover, the second aspect of the invention may take such a construction that the storage unit stores an address of the client to which the multicast data should be forwarded and a destination address of this piece of multicast data as the forward management information in a way that relates them to each other, and there is further included a client management information storage unit for storing a client identifier indicating the client to which the multicast data should be forwarded, a destination identifier indicating a transmission destination of this piece of multicast data, a time when this client and the transmission destination of this piece of multicast data have been stored in an interrelated manner in the forward management information, and a time when this client and the information about the transmission destination of this piece of multicast data have been deleted from the forward management information, in a way that relates them to each other on the basis of the forward management information.

Yet moreover, the second aspect of the invention may take such a construction that the storage unit stores an address of the client to which the multicast data should be forwarded, a destination address of the multicast data and a source address of the multicast address as the forward management information in a way that relates them to each other, and there is further included a client management information storage unit for storing a client identifier indicating the client to which the multicast data should be forwarded, a destination identifier indicating a transmission destination of this piece of multicast data, a source identifier indicating a transmission source of this piece of multicast data, a time when this client and the transmission destination of this piece of multicast data have been stored in an interrelated manner in the forward management information, and a time when this client and the information about the transmission destination of this piece of multicast data have been deleted from the forward management information, in a way that relates them to each other on the basis of the forward management information.

Furthermore, in case the information read by the reading unit is information indicating a change in a multicast receiving state, the managing unit may be constructed to update the forward management information stored on the storage unit by use of contents of this piece of information.

BRIEF DESCRIPTION OF THE DRAWINGS

Other aspects and/or advantages of the present invention will become apparent during the following discussion in conjunction with the accompanying drawings, in which:

FIG. 2 is a table showing an alignment of multicast address;

FIG. 9 is a view showing an outline of RFC1112;

FIG. 15 is a diagram showing an example of a receipt client information management table;

FIG. 22 is a diagram showing an example of entries retained in a receipt client information management table;

FIG. 23 is a diagram showing an example of the entries retained in the receipt client information management table;

FIG. 28 is a diagram showing an example of a user management table; and

DESCRIPTION OF THE PREFERRED EMBODIMENTS

[IP Multicast]

<Outline>

Figure 1:
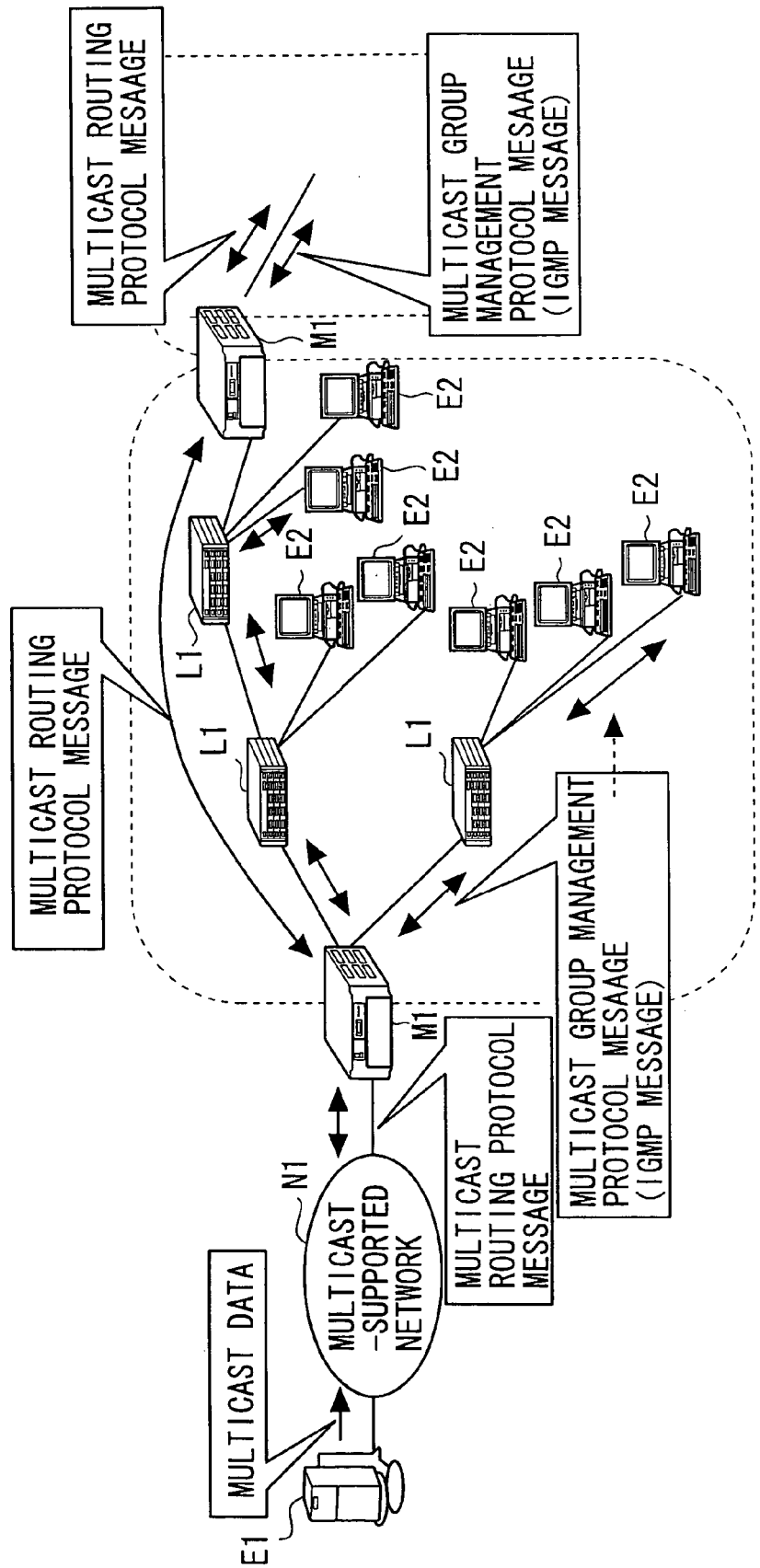
FIG. 1 is a view showing an example of a structure of a network using IP multicast.

A structure of IP multicast as a premise of the invention will be described. Note that a case where a data link layer is Ethernet will be explained in the following discussion. FIG. 1 is a view showing an example of a network using the IP multicast. In the IP multicast, a multicast address is used as an address. The IP multicast functions between a server (source) E1 and clients (receivers) E2, each which is an end system, and a multicast router M1.

In the IP multicast, multicast data are transmitted to multicast addresses. The multicast data are received by the clients E2 belonging to a multicast group via a multicast-supported network N1, the multicast router M1 and layer-2 switches L1. The IP multicast in an IPv4 environment is actualized by a multicast group management protocol such as IGMP and a multicast routing protocol.

IGMP messages (a multicast group control message) are exchanged between the clients E2 and the multicast router M1 adjacent thereto (with the layer-2 switches L1 interposed therebetween). By the IGMP, the multicast router M1 grasps the multicast group of each client E2 located under the multicast router M1.

A message of the multicast routing protocol is exchanged between the multicast routers M1 (with the layer-2 switch L1 interposed therebetween). By the multicast routing protocol, a multicast data distribution tree from a server E1 down to the plurality of individual clients E2 (receipt clients) is created between the multicast routers M1.

Next, a basic operation of a data transmission by the IP multicast will be explained. To begin with, the client E2 desiring to receive the multicast data notifies the multicast router M1 in a local network, of the IGMP message including information indicating that the client E2 desires to receive the multicast data. When the multicast router M1 receives the IGMP message, a state of the client E2 is that the client E2 is participating in the multicast group for receiving the desired multicast data. Namely, the client E2 becomes a member of the multicast group.

The server E1 transmits the multicast data (e.g., stream data) to each multicast address identified by class-D addresses. At this time, the server E1, irrespective of the number of clients belonging to the multicast group, transmits one piece of multicast data.

The multicast router M1 in the multicast-supported network N1 receives the multicast data transmitted from the server E1. The multicast router M1, according to each route to each clients E2 participating in the multicast group of the multicast data, copies the received multicast data corresponding to need and transfers the multicast data (original or copy) to each route. Namely, the multicast router M1 distributes the multicast data along the multicast data distribution tree created by the multicast routing protocol and extending from the transmission host (the server E1) down to each of the clients E2. Accordingly, one piece of multicast data transmitted by the server E is distributed finally to the plurality of clients E2 of the multicast group member within the network.

Next, the multicast address, the IGMP and the multicast routing protocol will respectively be described.

<Multicast Address>

The multicast address in the IPv4 will be explained. The multicast address is defined as a class-D address and takes a value within a range of "224.0.0.0" through "239.255.255.255" in a decimal notation. Therefore, the class-D addresses are identified by first four bits "1110".

FIG. 2 is a table showing how the multicast addresses are assigned. As shown in FIG. 2, some multicast addresses are reserved for specified applications. On the other hand, the each of addresses having a value within "239.0.0.0" through "239.255.255.255" is used as generally used multicast address (local site multicast addresses. The local site multicast addresses is used by enterprise networks, ISPs (Internet Service Providers), and so on.

Moreover, a concept or protocol termed SSM has recently come into an examination by IETF. The SSM is a multicast session identified by a pair of a multicast address (a multicast group address) and a source address of the multicast data, or is a mechanism thereof. A range of the multicast addresses for the SSM is, among the IPv4 class-D addresses, "232.0.0.0" through "232.255.255.255".

Note that, in the SSM, the source address of the multicast data to be received is designated by the IGMP. Hence, the multicast router and the end system need to implement the IGMPv3.

<IGMP>

Next, the IGMP will be explained. The client (the host) and the multicast router transfer and receive the IGMP messages to and from each other. By the IGMP message, the multicast router grasps and manages the client in the local network to which the multicast router itself is connected. In other words, the IGMP is a protocol for informing the multicast router that each client participates in an multicast group. In this case, the multicast router and the client are respectively required to implement functions defined by the IGMP. The IGMP includes a version 1 (v1) through a version 3 (v3). The IGMPv1 is defined in an appendix 1 to Request For Comments (RFC) 1112. The IGMPv2 is defined in RFC2236. The IGMPv3 is defined in RFC3376.

The IGMPv1, the IGMPv2 and the IGMPv3 are the same in the point of each conducting the multicast group management but the IGMP has different functions per version. The following are explanations of the IGMPs in the respective versions.

<<IGMPv1>>

Figure 3B:
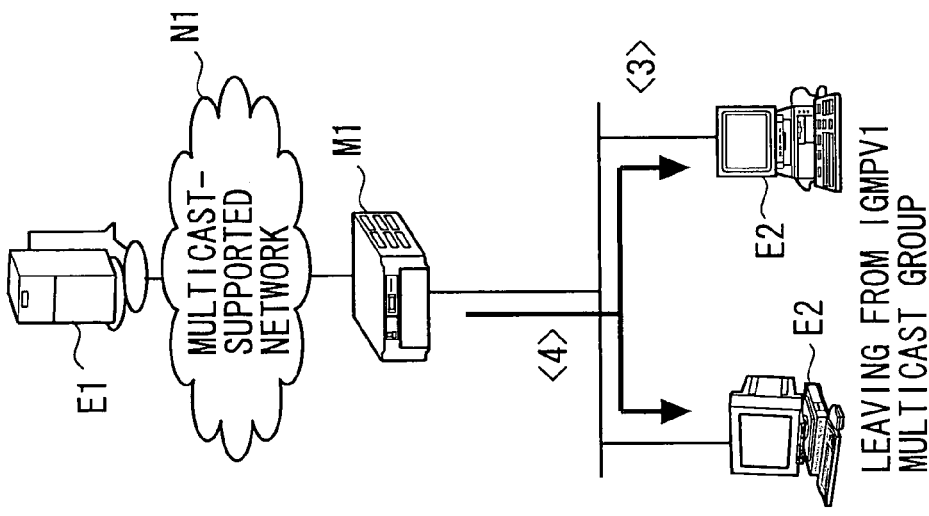
FIGS. 3A and 3B are views showing an outline of IGMPv1.
Figure 3A:
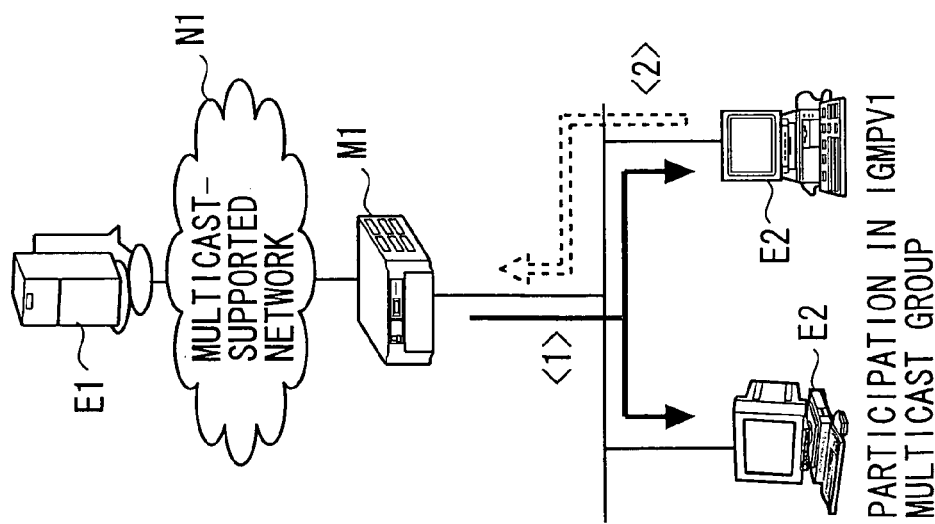

FIGS. 3A and 3B are views showing an outline of the IGMPv1. With respect to IGMPv1, a process in a case where the client E2 participates in the multicast group (see FIG. 3A) and a process in a case where the client E2 leaves the multicast group (see FIG. 3B), will be explained by use of FIGS. 3A and 3B.

To start with, the process in the case where the client E2 participates in the multicast group will be described by use of FIG. 3A. In the IGMPv1, the multicast router (IGMP Querier router) M1 periodically sends a Query message to a subnet <1>. The client E2 desiring to participate in the multicast group stores a Report message (Report) with a piece of information of the multicast group as a response to the Query message, and transmits the Report message. In other words, the client E2 responds to the Query message and sends the Report message that designates the multicast group <2>. The multicast router M1, in the case of receiving this Report message, sets an interface having received the Report message (i.e. the client E2 of a source of the Report) to forward the multicast data transmitted to a multicast address corresponding to the multicast group.

Next, the process in the case where the client E2 leaves the multicast group will be explained by use of FIG. 3B. The client E2 participating in the multicast group stops receiving the multicast data when stops functions related to the multicast by an end of process of an application using the multicast data, etc. <3>. With this process, the client E2 leaves the multicast group. In this case, the client E2 does not respond to the Query message.

The multicast router M1, in the case of receiving no Report message for a fixed period of time from the client E2, recognizes from a timeout that this client E2 has left the multicast group <4>. Then, after this recognition, the multicast router M1 stops the process of forwarding the multicast data to the client E2.

Thus, the multicast router M1 grasps, from the timeout with respect to the receipt of the Report message responding to the Query message, whether or not the client E2 keeps participating in the multicast group. Therefore, even when the client E2 leaves the multicast group, the multicast router M1 executes forwarding the multicast data to the client E2 till the timeout occurs. Namely, till the occurrence of the timeout, the multicast data continue to flow to the subnet to which the client E2 is connected.

<<IGMPv2>>

Figure 4B:
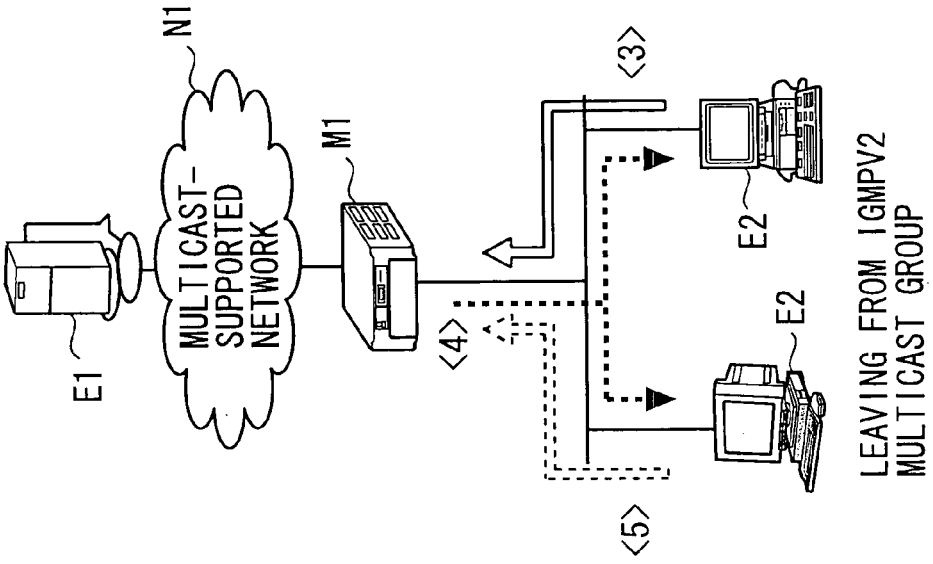
FIGS. 4A and 4B are views showing an outline of IGMPv2.
Figure 4A:
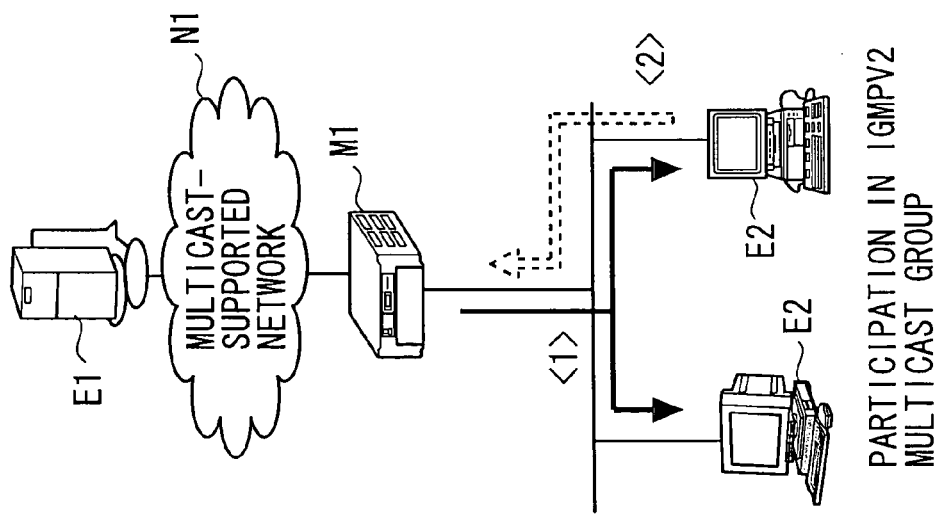

FIGS. 4A and 4B are views showing an outline of the IGMPv2. In regard to IGMPv2, a process in a case where the client E2 participates in the multicast group (see FIG. 4A) and a process in a case where the client E2 leaves the multicast group (see FIG. 4B), will be explained by use of FIGS. 4A and 4B.

At first, the process in the case where the client E2 participates in the multicast group will be described by use of FIG. 4A. In the IGMPv2, in the same way as the IGMPv1, the multicast router M1 periodically sends the Query message to the subnet <1>. The client E2 desiring to participate in the multicast group stores the Report message with a piece of information of the multicast group as a response to the Query message, and thus sends it <2>. The multicast router M1, in the case of receiving this Report message, sets an interface having received the Report message (i.e. the client E2) to forward the multicast data corresponding to the multicast group.

In the IGMPv2, the client E2, at a point of time when desiring to participate in the multicast group, is capable of transmitting an Unsolicited Report message regardless of receiving the Query message. The multicast router M1, in the case of receiving the Unsolicited Report, immediately recognizes that a group member appears as a subordinate. Then, it starts forwarding the multicast data to the client E2 as the group member.

Next, a process in the case where the client E2 leaves the multicast group will be described by use of FIG. 4B. The client E2 participating in the multicast group stores a piece of information of the multicast group in a Leave message (Leave) and transmits it to the multicast router M1, thereby leaving the multicast group <3>.

The multicast router M1, upon receiving the Leave message, confirms an existence of the client E2 (other group member) other than the sender of the Leave message with respect to the subordinates to the interface having received the Leave message. At this time, the multicast router M1 transmits a Group Specific Query message pertaining to this multicast group via the interface having received the Leave message <4>.

In case there exists other group member, the other group member sends the Report message in response to the Group Specific Query in order to inform of a purport of still wanting to receive <5>. The multicast router M1, when receives the Report message, recognizes the existence of other group member and continues to forward the multicast data to the corresponding interface.

On the other hand, the multicast router M1, in the case of receiving no Report message as a response to the Group Specific Query, namely, in the case of no existence of other group member, judges that no other group member exists under the interface, and stops forwarding the multicast data to the interface.

Next, differences between the IGMPv1 and the IGMPv2 will be explained. First, the IGMPv2 defines the Leave message for explicitly informing that the client E2 leaves the multicast group to which it has been belonging.

Second, the IGMPv2 defines the Group Specific Query for the multicast router M1 having received the Leave message to confirm as to whether other group member exists locally (in the local interface) or not.

Third, the IGMPv2 defines the Unsolicited Report for enabling the client E2, at the point of time when determining by the client E2 itself to participate in the multicast group, to promptly participate in the multicast group irrespective of receiving the Query message from the multicast router M1.

Fourth, the IGMPv2 defines that in a case where a multicast router (IGMPv1 router) M1 or a client (IGMPv1 client) E2 that behaves according to the IGMPv1 exists in an subnet, a multicast router that behaves according to the IGMPv2 (IGMPv2 router) M1 and a client that behaves according to the IGMPv2 (IGMPv2 client) E2, must behave according to the IGMPv1.

<<IGMPv3>>

Figure 5B:
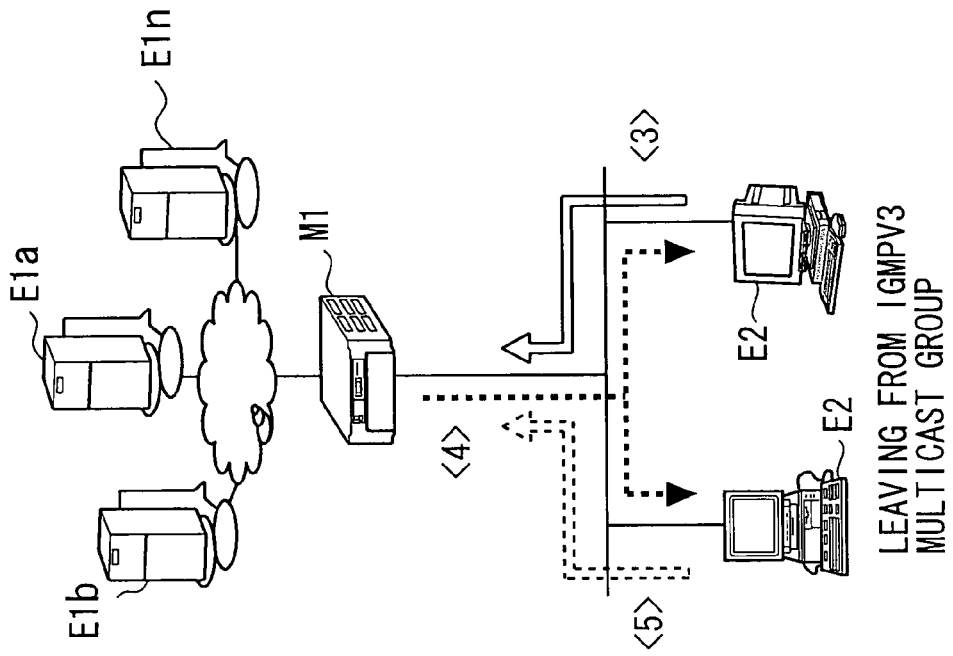
FIGS. 5A and 5B are views showing an outline of IGMPv3.
Figure 5A:
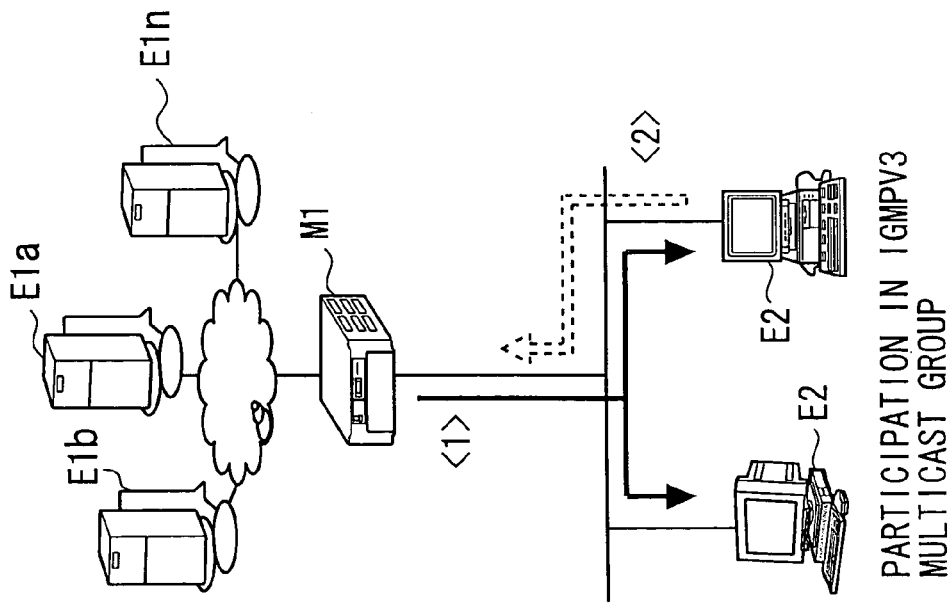

FIGS. 5A and 5B are views showing an outline of the IGMPv3. As for IGMPv3, a process in the case where the client E2 participates in the multicast group (see FIG. 5A) and a process in the case where the client E2 leaves the multicast group (see FIG. 5B), will be explained by use of FIGS. 5A and 5B.

To begin with, the process in the case where the client E2 participates in the multicast group will be described by use of FIG. 5A. In the IGMPv3, in the same way as the IGMPv1 and the IGMPv2, the multicast router M1 periodically sends the Query message to the subnet <1>. The client E2 desiring to participate in the multicast group stores the Report message with a piece of information of the multicast group as a response to the Query message, and thus sends it. At this time, the client E2, if it wants to designate a source (the server E1 (at least one of E1a, E1b, E1n)) for the multicast group, can transmit information of the server E1 becoming the source in a way that has it contained in the Report message <2>. The client E2 is capable of designating a plurality of servers E1 (0 or more: for example, the server E1a and E1b) becoming the sources of the multicast group.

Such a source designating method (a filter mode) has two types of modes, an INCLUDE mode and an EXCLUDE mode. In the INCLUDE mode, the client E2 receives the multicast data from the server E1 designated by the Report message. On the other hand, in the EXCLUDE mode, the client E2 receives the multicast data from a server E1 excluding the server E1 designated by the Report message.

The multicast router M1, upon receiving the Report message, forwards only the multicast data transmitted from the server E1 designated by the Report message among pieces of multicast data corresponding to the Report message via the interface having received the Report message. Therefore, the clients E2 subordinate to the multicast router M1 can receive only the multicast data transmitted from one or more arbitrary servers E1.

The multicast router M1, when receives the Report message including that a new server E1 to a client E2 being is set as a source of a multicast group, makes a judgement (merging of information) about a forwarding destination of the multicast data from the server E1. In this case, the multicast router M1 retains a result of the judgement, thereby forwarding the multicast data transmitted from the server E1 to the client E2 (i.e., transmitting from the interface).

In the IGMPv3, in case there exist only the clients E2 subordinate to an interface which have designated the INCLUDE mode for a certain multicast address, by an execution of merging the information, the filter mode being "INCLUDE", a source list including all the designated servers E1 is retained. Herein, the source list is a list of the addresses of the servers E1, for judging the source with respect to the multicast address.

Figure 6:
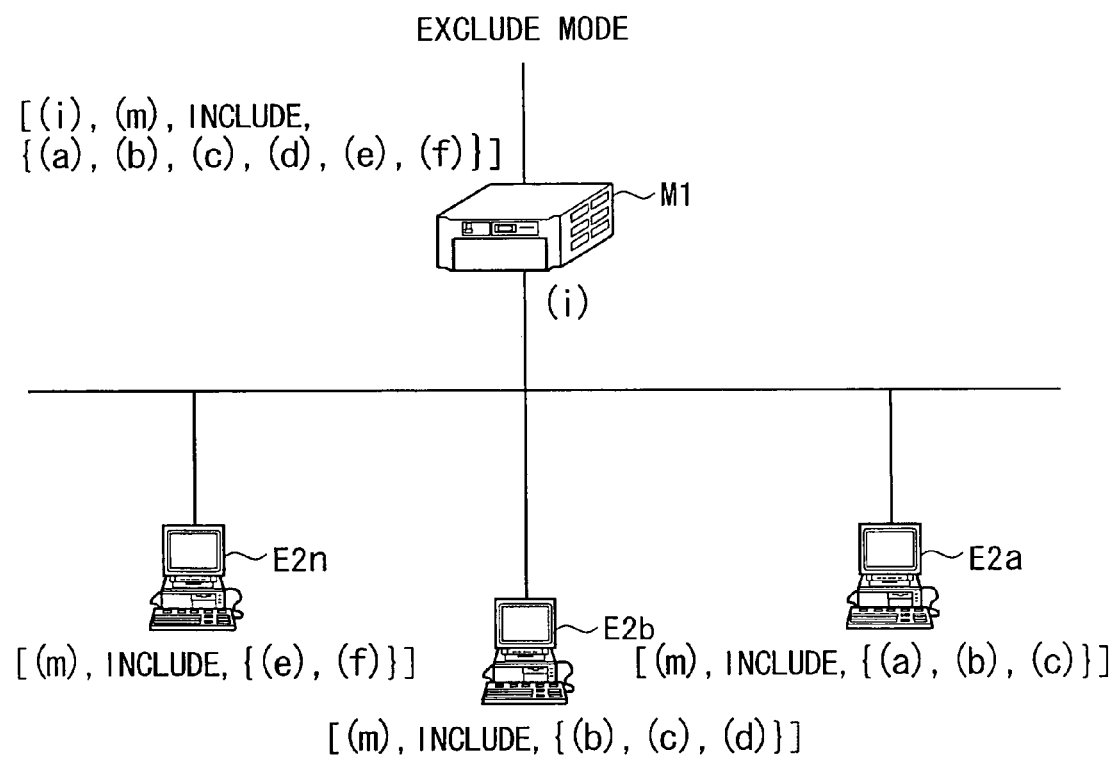
FIG. 6 is a view showing a state where a client designating an INCLUDE mode is connected.

FIG. 6 is a view showing a state where only the clients E2 that have designated the INCLUDE mode exist subordinately to the interface. For instance, states of clients E2a, E2b, E2n subordinate to an interface (i) of the multicast router M1 are assumed to be respectively [(m), INCLUDE, "(a), (b) and (c)"], [(m), INCLUDE, "(b), (c) and (d)"], and [(m), INCLUDE, "(e) and (f)"] for a multicast address (m). Herein, the setting shall be [the multicast address, the filter mode, the source list]. In this case, a state that should be retained by the multicast router M1 becomes [(i), (m), INCLUDE, "(a), (b), (c), (d), (e) and (f)"]. Namely, if all the client E2 subordinate to the interface (i) are in the INCLUDE mode, the setting of the filter mode with respect to this interface (i) becomes the INCLUDE mode, and the source list turns out to be the merging of the sources (namely, (a), (b), (c), (d), (e), and (f)) contained in the respective records.

Further, under a certain interface, if at least one client E2 having designated the EXCLUDE mode for the multicast address exists, the filter mode retained by the multicast router M1 becomes the EXCLUDE mode. Then, the multicast router M1 retains, as a source list, common elements of all the sources designated by the EXCLUDE mode excluding all the sources designated by the INCLUDE mode.

Figure 7:
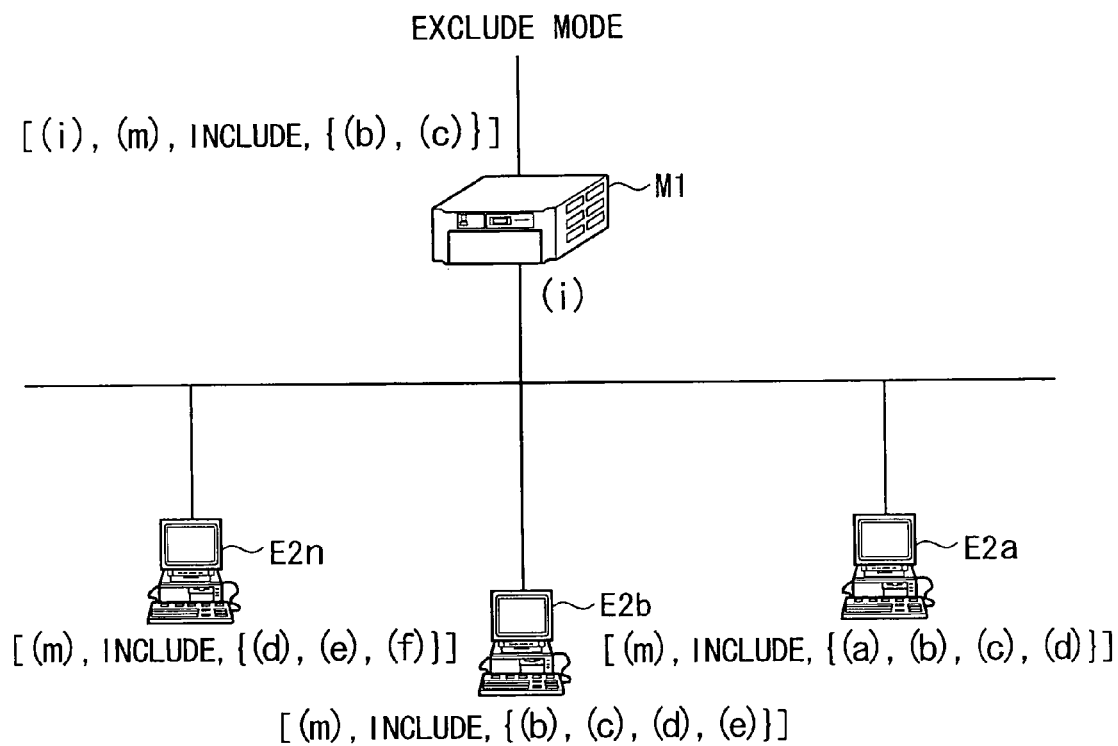
FIG. 7 is a view showing a state where a client designating an EXCLUDE mode is connected.

FIG. 7 is a view showing a state where the clients E2 that have designated the EXCLUDE mode exist subordinately to the interface (i). For instance, states of the clients E2a, E2b, E2n subordinate to the interface (i) of the multicast router M1 are assumed to be respectively [(m), EXCLUDE, "(a), (b), (c), and (d)"], [(m), EXCLUDE, "(b), (c), (d), and (e)"]], [(m), INCLUDE, "(d), (e), and (f)"]] for the multicast address (m). In this case, a state that should be retained by the multicast router M1 becomes [(i), (m), EXCLUDE, "(b)and (c)"]]. Namely, the clients E2 (E2a and E2b in this instance) of the EXCLUDE mode exist subordinately to the interface (i), and hence the filter mode of the interface (i) becomes the EXCLUDE mode. Then, the source list of the interface (i) becomes "(b) and (c)".

The multicast router M1 mages the states of the respective systems subordinate thereto, and retains the state thereof for each multicast address about each interface.

Further, the client E2 retains respectively the filter mode and the corresponding source list thereto for each socket (if a plurality of sockets exist) and for each multicast address per interface.

Next, a process in the case where the client E2 leaves the multicast group will be explained by use of FIG. 5B. The client E2 participating the multicast group sends to the multicast group a Report message in which a source list is empty in the INCLUDE MODE. Alternatively, the client E2 transmits a Report message including a change in the source information to the multicast group <3>. With the transmission of this Report message, the client E2 leaves this multicast group.

The multicast router M1, when receives the Report message, confirms an existence of the client E2 (other group member) other than the sender of the Report message with respect to the subordinates to the interface having received the Report message. Namely, the multicast router M1 transmits a Group Specific Query message pertaining to the multicast group via the interface having received the Report message. Alternatively, the multicast router M1, when receives the Report message including changing the source information, sends a Group And Source Specific Query message for confirming that the source information is to be changed <4>.

If other group member exists, this other group member sends a Report message in response to the Group Specific Query in order to inform of a purport of still wanting to receive. Alternatively, the other group member transmits the Report message for maintaining the source information to be changed <5>. The multicast router M1, upon receiving the Report message, recognizes the existence of other group member and continues to forward the multicast data to the interface.

On the other hand, the multicast router M1, in the case of receiving no Report message as a response to the Group Specific Query, i.e., in the case of no existence of other group member, judges that there does not exist no other group member subordinately to the interface, and stops forwarding the multicast data to the interface.

Next, an operation for changing a state of the client E2 in the IGMPv3 will be explained. The IGMPv1 and IGMPv2 define only operations of the client E2 relating to participates and leaves to/from the multicast group. In the IGMPv3, however, the client E2 is able to notify the multicast router M1 of changes of state relating to the multicast (changes of the source information and/or the filter mode). The multicast router M1, upon receiving the notification, performs operations reflected the change of the state.

The client E2 participating in the multicast group, when desires changing the source and/or the filter mode relating to the multicast group, transmits the Report message having information of the multicast group and information indicating changing in the filter mode and/or in the source, The multicast router M1, upon receiving the Report message, confirm as to whether or not the state change contained in the Report message may reflect to the information (for example, a result of the judgement by merging the information) stored by the multicast router M1. At this time, the multicast router M1 performs confirming about the state change by sending to the client E2 the Group and Source Specific Query message related to the multicast group and the source list pertaining to the multicast group. The client E2 receives the Group and Source Specific Query message. Then, the client E2, if wishes to maintain the source information that is to be changed about the multicast group, transmits to the multicast router M1 the Report message including a request for maintain the information of the changing target.

The multicast router M1, after receiving the Report message, grasps the information of one or more server E1 as sources relating to the change, maintains or updates the corresponding source list, and forwards the multicast data from the proper server E1.

The multicast router M1, in the case of receiving no Report message to the Group and Source Specific Query message about the multicast group, continues to forward the multicast data in accordance with the present information.

In the IGMPv3, the client E2, at a point of time when its own state is changed (such as stopping the receipt of the multicast data and changing the filter mode, and so on), can transmit an Unsolicited Report message irrespective of receiving the Query message.

The conventional IGMPs (the IGMPv1 and IGMPv2) provide the multicast group management function based on only the multicast addresses. On the other hand, the IGMPv3 provides the multicast group management function using a set of one multicast address and zero or more of the servers E1 becoming the source of the multicast data. Namely, the client E2 can designate zero or more of the servers E1 with respect to a certain multicast group and can request for receiving the multicast data. In other words, if a restriction (the number of the servers E1 is 0) is not given to the server E1 with respect to the multicast address, the management becomes equal to the management of only the same multicast addresses as by the conventional IGMPs. Further, if (one or more) servers E1 are designated, though the multicast address is the same, the multicast data transmitted from other than the designated servers E1 are not processed (neither received nor forwarded). Moreover, in the same Report message, the plurality of multicast addresses and the source related thereto can be designated.

Further, if only one source is designated, a certain multicast session is expressed such as (S, G) by use of a source S and a multicast group G. Therefore, even when the same multicast address G is used about a plurality of multicast sessions, if each source S is different each other, it is able to manage each of the multicast sessions as a different multicast session. This mode is called SSM.

Note that a target of all versions of IGMP is IPv4. A protocol corresponding to the IGMP on which targets the IPv6 is the MLD. The MLD is being standardized by the magma WG (working group) of the IETF. A protocol corresponding to the IGMPv2 is MLD for IPv6 (RFC2710). A protocol corresponding to IGMPv3 is MLDv2 for IPv6 (draft-vida-mld-v2-xx.txt).

The IGMP (IGMPv1) is defined in APPENDIX I to RFC1112 and becomes the Internet Standard. Further, the IGMPv2 is defined in RFC2236 and is added a function related to "low leave latency" as compared with the IGMPv1 by addition of the Leave message. Moreover, the IGMPv3 has a added function of "source filtering" for managing the group membership information by designating the source together with the multicast address, and is so designed as to be mutually operable for the IGMPv1 and IGMPv2. The source filtering is a function enabling a certain system to receive the multicast data from only a specified source or a specified source group with respect to a certain multicast address.

A message of the IGMPv3 is encapsulated into IPv4 datagram, and an IP protocol number is "2". Each of the IGMP messages is sent with "IP TTL (Time-To-Live)=1". These definitions are the same as the IGMPv1 and IGMPv2.

Further, as in the case of the IGMPv1, the Query message and the Report message are used (the contents are, however, as a matter of course, different) as messages of the IGMPv3. Further, in the IGMPv3, a function equivalent to the Leave message in the IGMPv2 is actualized by sending the Report message of the IGMPv3 having a state that "the list of sources of the multicast data that a client desires to receive the multicast data is set empty". Moreover, in the IGMPv3, an action equivalent to Join (a transmission of the Report message) in the IGMPv1 and IGMPv2 is actualized by sending the Report message of the IGMPv3 having a state that "the list of sources of the multicast data that a client does not desire to receive the multicast data is set empty".

Next, differences between the IGMPv2 and the IGMPv3 will be described. First, in the IGMPv3, the source filtering is added.

Second, in the IGMPv3, the Leave message (the message for notifying of leaving the multicast group) is deleted from the specifications. Therefore, in the IGMPv3, the leaving from the multicast group is carried out by sending the Report message indicating that there is no source that requires forwarding with respect to the multicast group.

Third, the IGMPv3 enables the notification of the change of the state. Namely, in the IGMPv3, each client, when changing the source and/or the filtering mode about a certain multicast group is occurred, is able to notify the multicast router of the changing by the Report message.

Fourth, the IGMPv3 defines the Group and Source Specific Query. According to the definition, when the client notifies the multicast router of changing the source and/or the filtering mode by the Report message, the multicast router confirms subordinates to the interface as to whether the change in the formation of the source for the multicast group may reflect in or not.

Fifth, the IGMPv3 defines that the multicast router supporting the IGMPv3 (IGMPv3 router), in case there exists a multicast router or a client operating based on the IGMPv2 other than the IGMPv3 router itself, must operate based on the IGMPv2. Similarly, the IGMPv3 is defined that the IGMPv3 router, in case there exists a multicast router or a client operating based on the IGMPv1, must operate based on the IGMPv1.

Sixth, in the IGMPv3, it was abolished the Report message restraining function by the client. Namely, when a network is handled by the IGMPv3, unlike the IGMPv1, IGMPv2, the Report message is sent to an address "224.0.0.22" indicating all the IGMPv3 routers. This abolition is effectuated in consideration of the UGMP Snooping in a bridge/L2 switch.

Seventh, in the IGMPv3, the IGMPv3 router must be capable of receiving any types of addresses (unicast or multicast) assigned to the interface at which the Report message has arrived, and confirming as to whether it is the Report message or not.

<Multicast Routing Protocol>

Figure 8:
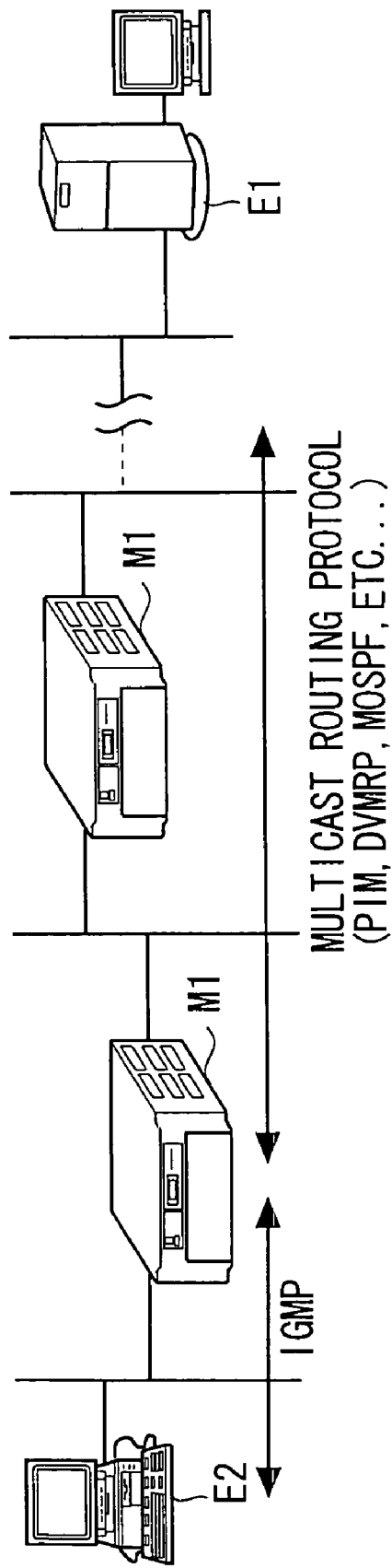
FIG. 8 is a view showing an outline of a multi routing protocol.

FIG. 8 is a view showing an outline of a multicast routing protocol. The multicast routing protocol will be explained by use of FIG. 8.

The multicast routing protocol is, in a network configured by a plurality of multicast-supported routers and/or layer-3 switches (a plurality of multicast routers M1), a protocol for controlling routes (or for creating a route tree). The multicast routing protocol determines one or more interfaces of the multicast routers M1 for transmitting the multicast data, in order to distribute the multicast data along routes to each client E2. The multicast routing protocol is used between the multicast routers M1.

The multicast routing protocols are DVMRP (Distance Vector Multicast Routing Protocol: used in MBone and defined in RFC1075), PIM (Protocol Independent Multicast : defined in RFC2362, and an examination of a new version by IETF is underway), MOSPF (Multicast OSPF operable only on OSPF (Open Shortest Path First) and defined in RFC1584, RFC1585) and so forth. Among them, the PIM is a de facto standard.

<RFC1112>

FIG. 9 is a diagram showing an outline of RFC1112. RFC1112 will be described by use of FIG. 9. RFC1112 defines mapping between an IP address of the class-D and a physical address, a filtering function of receiving only a packet having physical addresses corresponding to a specified class-D IP address and raising the packet up to a higher-order layer, and so forth. For carrying out the function of RFC1112, both of the router and the client are required to implement RFC1112.

The mapping (correspondence) between the IP address and the physical address of the class-D is defined such that low-order 23 bits of the class-D IP address are padded to low-order 23 bits of a multicast physical address "01:00:5E:00:00:00" (a hexadecimal number) (refer to RFC1700) . For example, the IP address "239.133.130.34" becomes the physical address "01:00:5E:05:82:22".

<Multicast on IPv6>

Next, the multicast in an IPv6 environment will be explained. A protocol equivalent to the IGMPv3 in the IPv6 is the MLDv2 that is in the process of being examined by the IETF. The following points are main differences between the IGMP and the MLDv2. First, the MLDv2 does not specify the IGMP in an IPv4 header and uses an ICMPv6 message type (Multicast Listener Query: Type=decimal 130, MLD Version 2 Multicast Listener Report: Type=decimal 131, MLD version 2 Multicast Listener Done: Type=decimal 132).

Second, in the MLDv2, the multicast MAC address is generated by mapping low-order 32 bits of the 128-bit IPv6 address to the 48-bit MAC address "33:33:xx:xx:xx:xx".

Accordingly, the multicast differences between the IPv4 and the IPv6 are recognizable and distinguishable as well, and there is not much difference in operation between the IGMPv3 and the MLDv2. Moreover, there exists a multicast routing protocol such as the PIM capable of supporting the IPv6.

[Principle]

<System structure>

Figure 10:
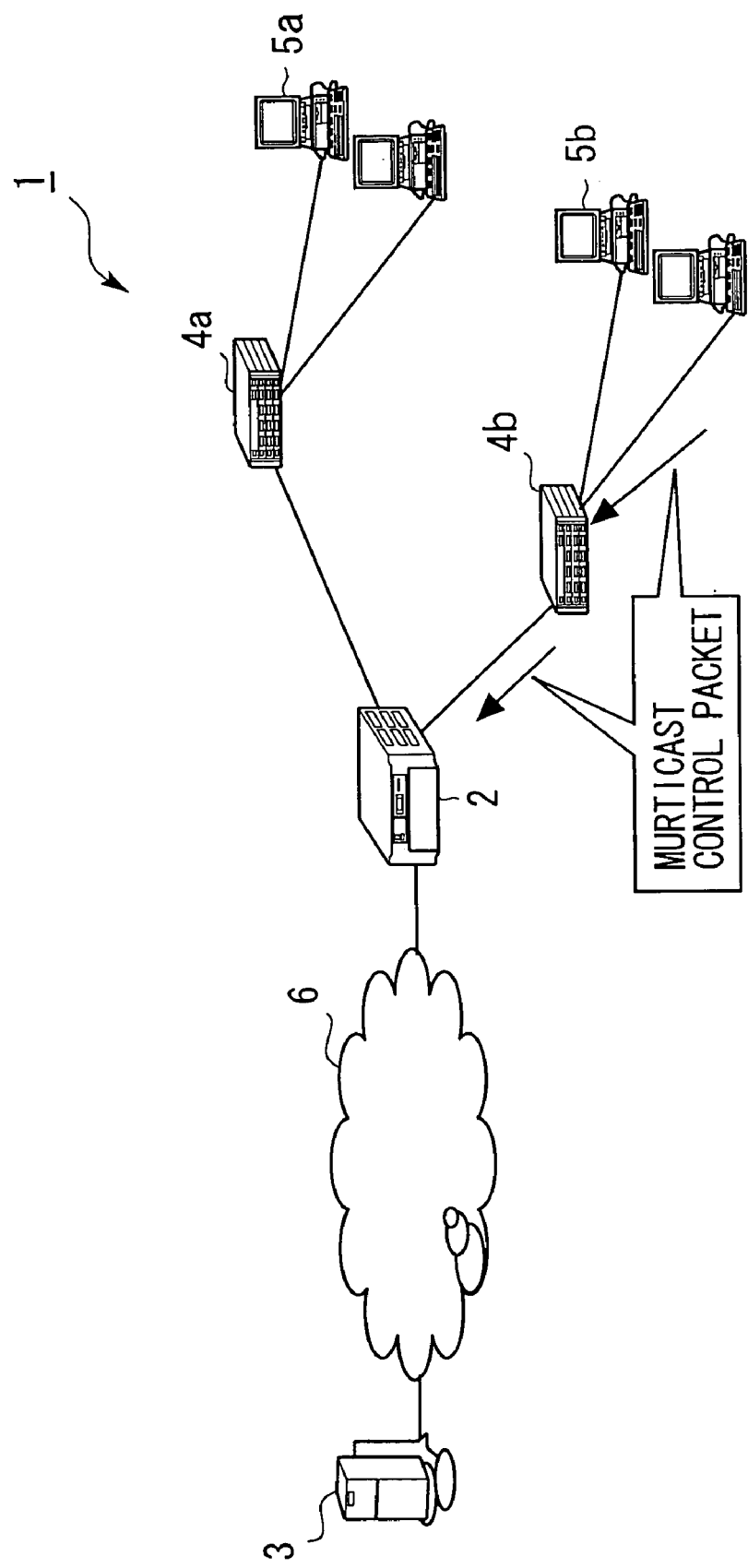
FIG. 10 is a view illustrating a forwarding system involving the use of a forwarding device of the invention.

Next, a principle of a forwarding device relating to the invention will be described by use of the drawings. FIG. 10 is a view showing a forwarding system 1 in which the forwarding device corresponding to the invention is utilized. The forwarding system 1 is configured by use of a forwarding device 2, a server 3, layer-2 switches 4 (4a, 4b), clients 5 (5a, 5b) and a multicast-supported network 6.

To begin with, constructions other than the forwarding device 2 will be explained. The server 3 is constructed by use of an information processing device such as a personal computer, a workstation, etc., transmits the multicast data to the clients 5.

The layer-2 switch 4 accommodates one or more clients 5. Herein, the layer-2 switch 4a accommodates the client 5a that does not receive the multicast data, and the layer-2 switch 4b accommodates the client 5b receiving the multicast data.

Each client 5 is constructed by using an information processing device such as a personal computer, a workstation, and so on. Herein, the client 5a is set not to receive the multicast data from the server 3, while the client 5b is set to receive the multicast data from the server 3. Therefore, the client 5b transmits a multicast control packet to the forwarding device 2. Namely, the multicast control packet is transferred and received between the forwarding device 2, the layer-2switch 4b and the client 5b. The multicast control packet is datagram for notifying the forwarding device 2 of a desire for or a stop of receiving the multicast data. An IGMPv3 message is given by way of an example of such a multicast control packet.

The multicast-supported network 6 is a network configured by use of the multicast-supported routers and layer-3 switches.

Figure 11:
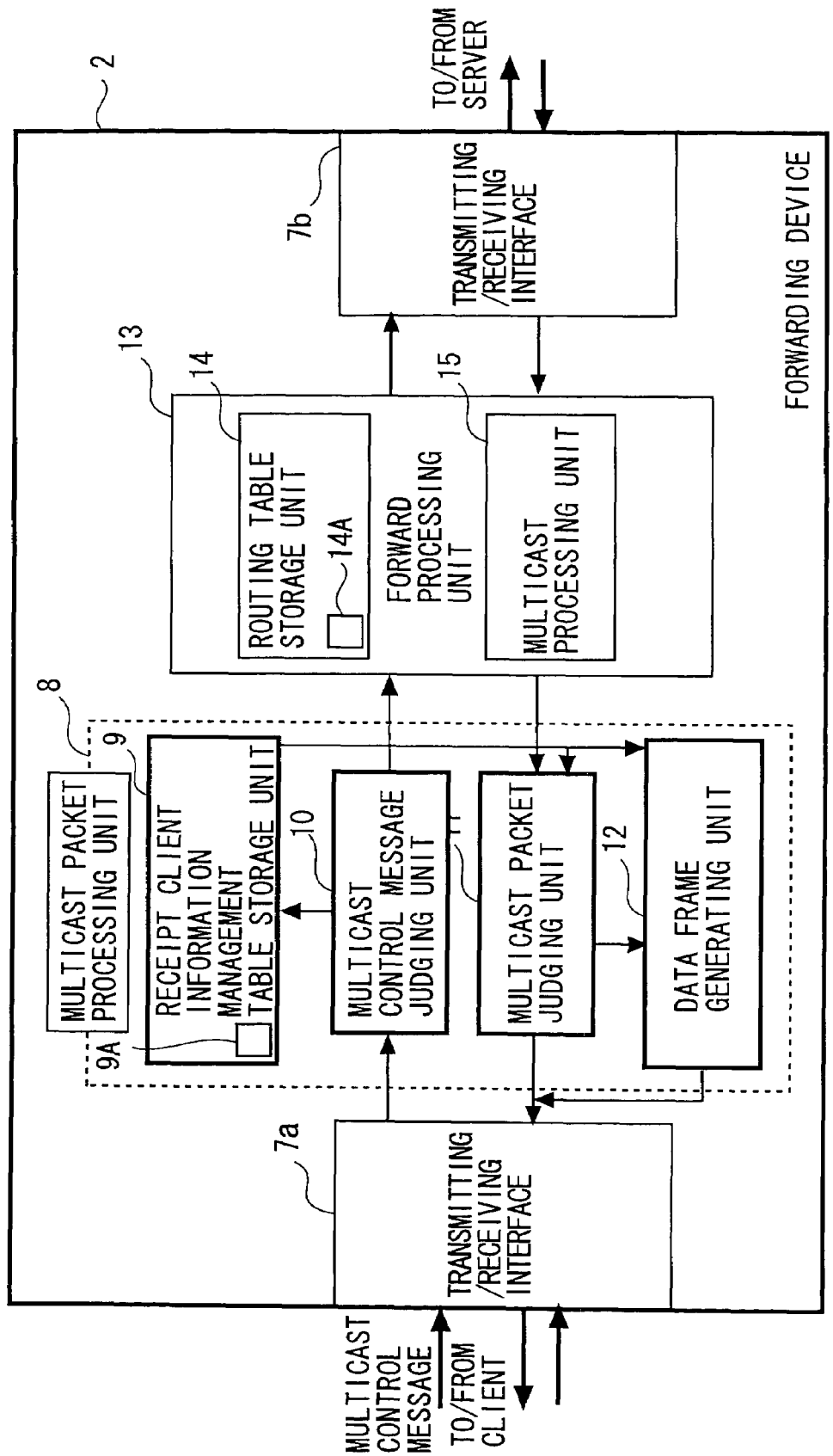
FIG. 11 is a block diagram of the forwarding device.

FIG. 11 is a block diagram showing the principle of the forwarding device 2. Next, the forwarding device 2 will be explained by using FIG. 11. The forwarding device 2 receives the multicast control packet from the client 5b, stores content thereof and judges which client 5 to which the multicast packet should be forwarded. Then, the forwarding device 2, upon receiving the multicast packet from the server 3, forwards a content of the received multicast packet to each client 5b in a way that unicasts it thereto. The forwarding device 2 is constructed by using transmitting/receiving interfaces 7 (7a, 7b), a multicast packet processing unit 8 and a forward processing unit 13 in order to execute such a process.

Each of the transmitting/receiving interfaces 7 transmits and receives the data to and from other devices via the network. The transmitting/receiving interface 7a transmits and receives the data to and from the layer-2 switch 4 and the client 5 via the network. Herein, the transmitting/receiving interface 7a transmits and receives the data to and from the client 5 via the layer-2 switch 4. Normally, the forwarding device 2 includes a plurality of transmitting/receiving interfaces 7a. The transmitting/receiving interface 7b transmits and receives the data to and from the server 3 via the network (the multicast-supported network 6).

The multicast packet processing unit 8 is provided for each of transmitting/receiving interface 7a and transmitting/receiving interface 7b. Alternatively, one single multicast packet processing unit 8 is provided for all the transmitting/receiving interfaces 7a, 7b. In FIG. 11, for a convenience, one multicast packet processing unit 8 is shown. The multicast packet processing unit 8 manages the transmitting/receiving interface 7a corresponding thereto. The multicast packet processing unit 8 judges, from among the clients 5 subordinate to the transmitting/receiving interfaces 7 managed by itself, which client 5 the multicast packet received by the transmitting/receiving interface 7b should be forwarded to. The multicast packet processing unit 8, for executing such a process, includes a receipt client information management table storage unit 9, a multicast control message judging unit 10, a multicast packet judging unit 11 and a data frame generating unit 12.

The receipt client information management table storage unit 9 is stored with a receipt client information management table 9A. The receipt client information management table 9A is stored with information about the respective clients 5 subordinate to the forwarding device 2.

The multicast control message judging unit 10 judges whether the packet received by the transmitting/receiving interface 7a from the client 5 is the multicast control packet or not. The multicast control message judging unit 10, in case the received packet is the multicast control packet, reflects a content of the packet in the receipt client information management table 9A. At this time, the multicast control message judging unit 10 transfers the packet to the forward processing unit 13. Whine on the other hand, in case the received packet is not the multicast control packet, the multicast control message judging unit 10 transfers the packet to the forward processing unit 13.

The multicast packet judging unit 11 judges whether the packet received from the forward processing unit 13 is a multicast packet or not. The multicast packet judging unit 11, in case the packet is the multicast packet, transfers the packet to the data frame generating unit 12. While on the other hand, in case the packet is not the multicast packet, the multicast packet judging unit 11 forwards the packet via the transmitting/receiving interface 7a.

The data frame generating unit 12 generates, based on the multicast packet received from the multicast packet judging unit 11, a unicast packet (a multicast frame that should be transmitted to the client 5 (5b)) that should be transmitted to the client 5 (5b) subordinate to the transmitting/receiving interface 7a.

The forward processing unit 13 executes a routing process included in a normal router and a multicast routing process. Therefore, the forward processing unit 13 has a routing table storage unit 14 stored with a routing table 14A, and a multicast processing unit 15 for executing the multicast routing process.

<Example of Operation>

Next, an example of an operation of the forwarding device 2 will be described. Wen the transmitting/receiving interface 7a receives the multicast control packet, the multicast control message judging unit 10 judges (checks) whether the received packet is the multicast control message or not. The multicast control message judging unit 10, in case the received packet is the multicast control message, has a content of the packet reflected in the receipt client information management table 9A. Further, the multicast control message judging unit 10 transfers the packet to the forward processing unit 13. Then, the forward processing unit 13 has a content of the multicast control packet received as forward control information of the normal multicast data, reflected in the routing table 14A and in the multicast processing unit 15.

While on the other hand, the multicast control message judging unit 10, in case the received packet is not the multicast control packet, transfers the packet to the forward processing unit 13. Then, the forward processing unit 13 executes a forwarding process of the packet.

When the transmitting/receiving interface 7b receives the multicast packet, the forward processing unit 13 judges which transmitting/receiving interface 7a the received multicast data should be forwarded from. Then, the forward processing unit 13 transfers the received multicast packet to the multicast packet processing unit 8 that manages the thus-judged transmitting/receiving interface 7a.

The multicast packet transferred to the multicast packet processing unit 8 from the forward processing unit 13, is processed by the multicast packet judging unit 11. The multicast packet judging unit 11 refers to the receipt client information management table 9A and thus confirms an existence or non-existence of the client 5*b* to which the received multicast packet should be forwarded. In case such a client 5*b* exists, the multicast packet judging unit 11 transfers the received multicast packet to the data frame generating unit 12.

The data frame generating unit 12 converts the received multicast packet into an unicast packet addressed to the client 5*b*, and forwards the unicast packet to the client 5*b* via the transmitting/receiving interface 7*a*. At this time, the data frame generating unit 12 generates a plurality of unicast packets as the necessity arises. For instance, in case there exist a plurality of clients 5*b* that the received multicast packet should be forwarded to, one or more unicast packets are to be generated.

While on the other hand, in case these clients 5*b* do not exist, the multicast packet judging unit 11 forwards the received multicast packets to other devices via the transmitting/receiving interface 7*a*. Such other devices are, for example, other forwarding device 2 connected to the forwarding device 2, the multicast-supported router, and so on.

Outline of Embodiments

Next, the forwarding device, i.e., a multicast router 16 in an embodiment of the invention will be described by use of the drawings. Note that the description of the embodiment is an exemplification, and the architecture of the invention is not limited to the following discussion. Further, in the following discussion, an explanation is made by exemplifying a network to which the IPv4 and the IGMPv3 are applied. In a case where the IPv6 is applied, the invention can be embodied in the same procedure by taking into consideration a difference between the multicasting on the IPv4 and the multicasting on the IPv6 such as applying the MDLv2 as a substitute for the IGMPv3.

Figure 12:
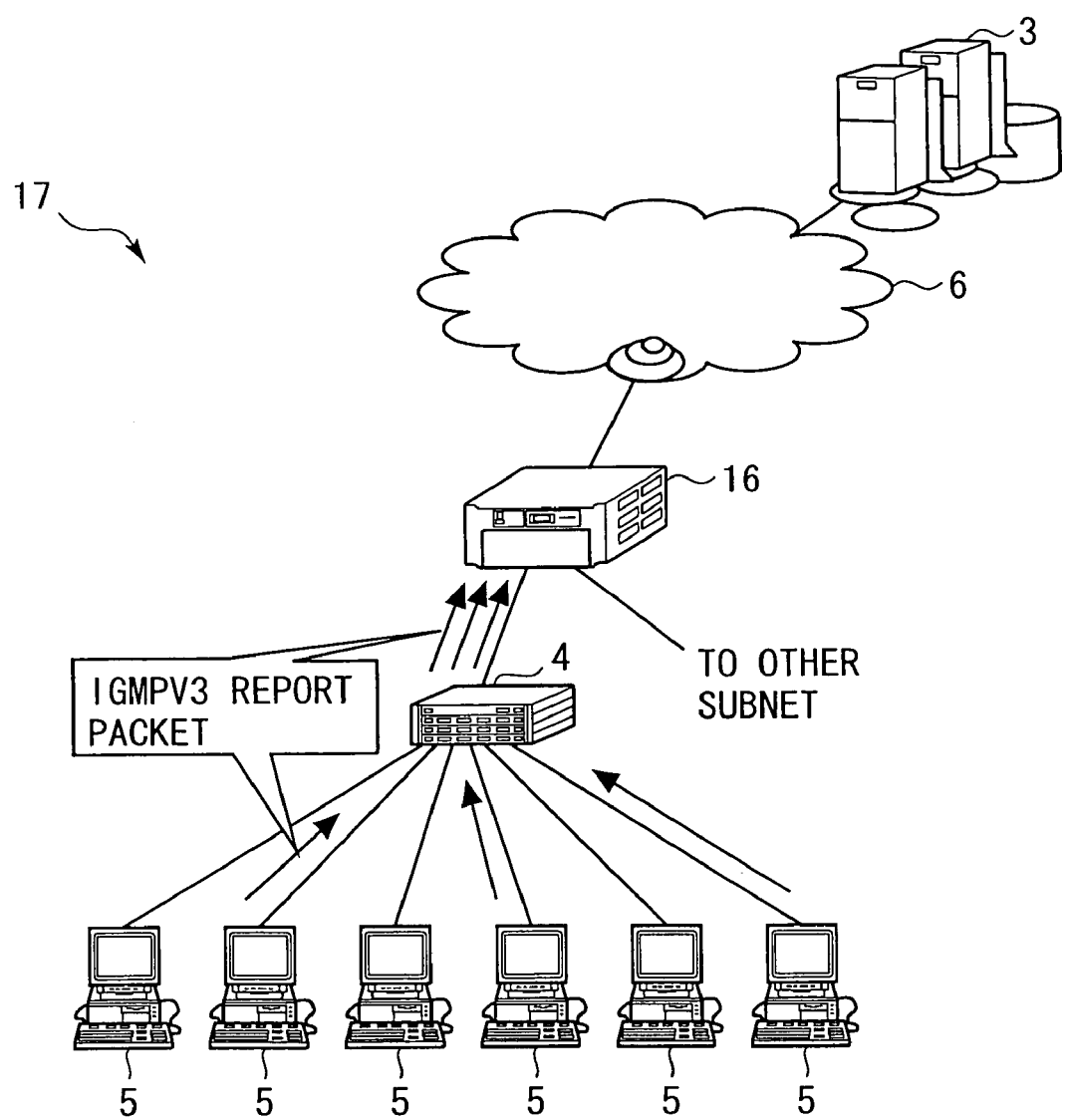
FIG. 12 is a view showing a view showing a network structure of a multicast system.

FIG. 12 is a view showing a network configuration of a multicast system 17 using the multicast router 16. The multicast system 17 is configured by using the server 3, the multicast-supported network 6, the multicast router 16, the layer-2 switch 4 and a plurality of clients 5.

At first, constructions other than the multicast router 16 will be explained. The basic constructions of the server 3, the multicast-supported network 6, the layer-2 switch 4 and the client 5 are as shown in the description of the principle.

Figure 13:
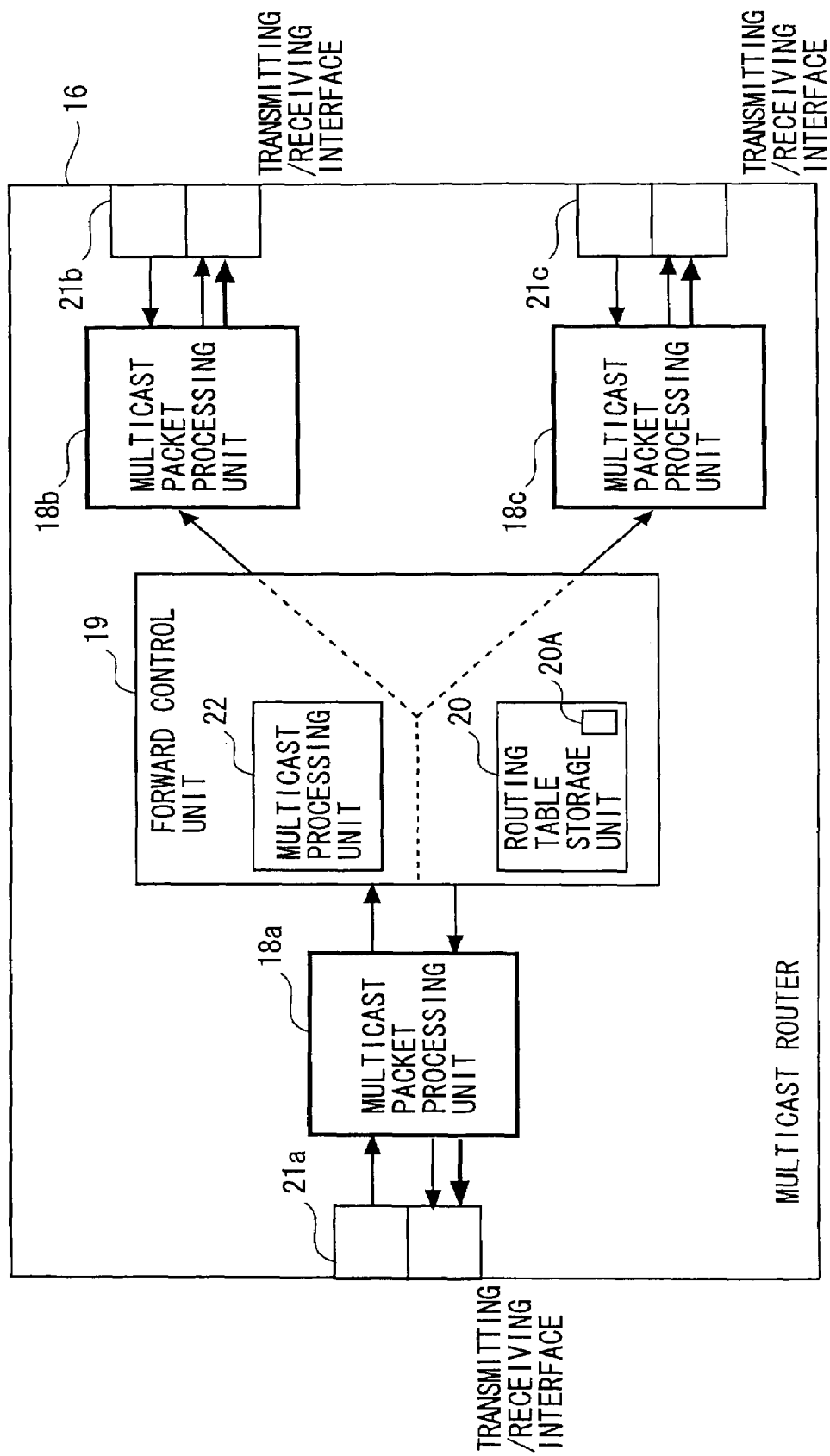
FIG. 13 is a block diagram of a multicast router.

FIG. 13 is a block diagram showing a construction of the multicast router 16. The construction of the multicast router 16 will be described by use of FIG. 13. The multicast router 16 includes, hardwarewise, a CPU (central processing unit), a main memory (e.g., RAM), and secondary storage device (e.g., flash memory), and so on. The multicast router 16, as a variety of programs (OS (operating system), applications, etc.) stored on the secondary storage device are loaded into the main memory and executed by the CPU, functions as a device including a multicast packet processing unit 18 (18*a*, 18*b*, 18*c*), a forwarding control unit 19, a transmitting/receiving interface 21 (21*a*, 21*b*, 21*c*) and so on.

Figure 14:
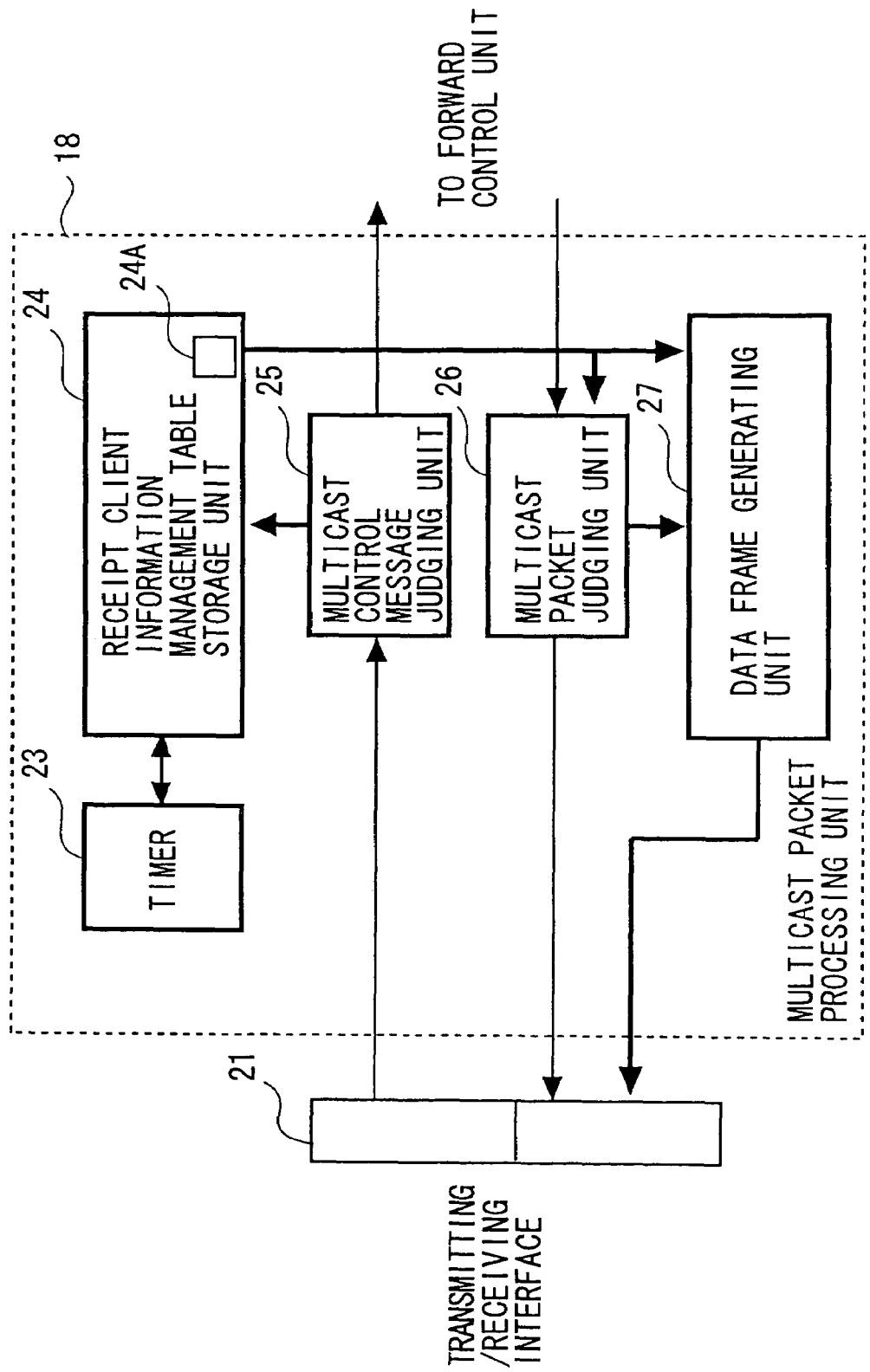
FIG. 14 is a block diagram of a multicast packet processing unit.

FIG. 14 is a block diagram showing a construction of the multicast packet processing unit 18. The multicast packet processing unit 18 will be described by sue of FIG. 14. The multicast packet processing unit 18 is constructed by using a timer 23, a receipt client information management table storage unit 24, a multicast control message judging unit 25, a multicast packet judging unit 26, and a data frame generating unit 27.

The timer 23 is constructed by use of a timer device, a CPU, a RAM, and so on. The timer 23 starts measuring a time upon a transmission of a Query message via the transmitting/receiving interface 21 corresponding to the multicast packet processing unit 18 provided with the timer itself. The timer 23 measures a time with respect to each of entries in a receipt client information management table 24A. Then, the timer 23 judges whether or not a Report message to the Query message is received within a fixed period of time via the transmitting/receiving interface 21. Namely, the timer 23 judges whether or not the Report message is received within the fixed period of time in regard to each of the entries in the receipt client information management table 24A. The timer 23, upon a receipt of the Report message with respect to a certain entry in the receipt client information management table 24A, resets the time measurement (a value of the time measurement is reset to 0) with respect to the entry.

For instance, three times as much time as a transmission interval of the Query message is set in the timer 23. In this case, the timer 23, in case the Report message is not received during that the Query message is sent three times, falls into a timeout. In a case where the transmission interval of the Query message is 125 seconds, the timer 23 is set so as to count 375 seconds.

The timer 23, in the case of falling into the timeout, judges that the client 5 corresponding to the entry did not receive the multicast data by the time due to some cause. Therefore, the timer 23 deletes, from the receipt client information management table 24A, information about the client 5 corresponding to the entry with the timeout occurred. Namely, the timer 23 deletes, from the receipt client information management table 24A, the entry related to the client 5 corresponding to the entry with the timeout occurred. Hence, in case the timer 23 falls into the timeout, the forwarding of the multicast data to the client 5 corresponding to the entry is stopped.

The processes of the timer 23 are similarly executed even in the case of the MLDv2 in the IPv6 environment.

The receipt client information management table storage unit 24 is constructed by use of a hard disk and a nonvolatile storage device such as a flash memory, and so on. The receipt client information management table storage unit 24 is stored with the receipt client information management table 24A.

FIG. 15 is a diagram showing an example of the receipt client information management table 24A. The receipt client information management table 24A will be explained by use of FIG. 15.

The receipt client information management table 24A manages information necessary for judging which multicast data the individual client 5 wants to receive. The receipt client information management table 24A is created and updated based on information included in the Report message sent from each client 5 and received via the transmitting/receiving interface 21 corresponding to the table 24A itself. The receipt client information management table 24A is also stored with a MAC address because of being a piece of local interface information.

The receipt client information management table 24A has entries each containing field items such as Entry Number, Client Address, Client MAC Address, Multicast Address, Source Address and Filter Mode.

The Entry Number is a uniquely number assigned to each entry. In the receipt client information management table 24A shown in FIG. 15, one Entry Number is assigned per Client Address. Namely, in the receipt client information management table 24A shown in FIG. 15, a plurality (one or more) of Multicast Addresses, Source Addresses and Filter Mode are assigned to one Client Address.

The Client Address represents an IP address of the client 5 located subordinately to the transmitting/receiving interface 21 corresponding to the multicast packet processing unit 18 provided with the receipt client information management table storage unit 24.

The Client MAC Address represents a MAC address mapping to the Client Address in the same entry. The Client MAC Address indicates a MAC address of the client 5 having the Client Address in the same entry.

The Multicast Address represents a multicast address of the multicast data that the client 5 having the Client Address in the same entry desires to receive. There might be a case in which one entry retains a plurality of multicast addresses (example: the entry number 1 in FIG. 15).

The Source Address represents an address (IP address) of the server 3 becoming a transmission source of the multicast data with respect to the Multicast Address mapping thereto. The multicast router 16 supports the IGMPv3. Hence, there might be a case where a plurality of source addresses is retained for one multicast address (example: the entry number 1 in FIG. 15).

The Filter Mode represents a filter mode pertaining to the multicast address mapping thereto. The filter Mode has a value of any one of "INCLUDE" and "EXCLUDE".

Herein, the receipt client information management table 24A will be explained by giving an example of a multicast address "238.0.0.123". The receipt client information management table 24A shown in FIG. 15 has the following information.

The client 5 having an address of "210.23.171.aa" and the client 5 having an address of "210.23.171.ff" desire to receive the multicast data having a source address of "61.143.221.2". The client 5 having the address of "210.23.171.aa", the client 5 having an address of "210.23.171.dd" and the client 5 having the address of "210.23.171.ff" desire to receive the multicast data having a source address of "61.143.221.3". The client 5 having the address of "210.23.171.aa" and the client 5 having the address of "210.23.171.dd desire to receive the multicast data having a source address of "61.143.221.4". The client 5 having the address of "210.23.171.ff" desires to receive the multicast data having a source address of "61.143.221.5". Then, the client 5 having the address, of "210.23.171.dd" desires to receive the multicast data having a source address other than those described above. Moreover, the client 5 in the entry assigned the entry number 1 receives the multicast data addressed to a multicast address of "238.0.0.123" only in the case of being transmitted from the servers 3 having source address of one of "61.143.221.2", "61.143.221.3", and "61.143.221.4".

The multicast control message judging unit 25 is constructed by use of a CPU, a RAM, and so on. The multicast control message judging unit 25 judges whether the packet received via the transmitting/receiving interface 21 corresponding to the multicast packet processing unit 18 provided with the multicast control message judging unit 25 itself, is a multicast control packet or not. Namely, the multicast control message judging unit 25 judges whether or not the packet received via the corresponding transmitting/receiving interface 21 is a packet including a multicast control message (an IGMP Report, a Leave message, a Report message that are voluntarily transmitted by the client). The multicast control message judging unit 25, in case the received packet is the multicast control packet, recognizes that the client 5 desiring to receive the multicast data exists subordinately to the transmitting/receiving interface 21 corresponding thereto. The multicast control message judging unit 25, in case the received packet is the multicast control packet, reflects contents of the. packet in the receipt client information management table 24A (contents of the receipt client information management table 24A are updated or changed in accordance with the contents of the packet). At this time, the multicast control message judging unit 25 transfers the packet also to the forwarding control unit 19. While on the other hand, in case the received packet is not the multicast control packet, the multicast control message judging unit 25 transfers the packet to the forwarding control unit 19.

The multicast control message judging unit 25 judges that the packet including, for instance, the Report message (IGMP Report) is the multicast control packet, and executes the process. Herein, the Report message will be explained.

Figure 16:
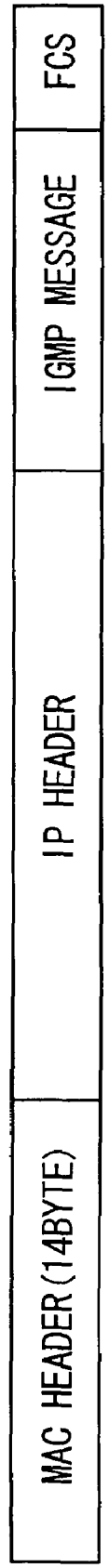
FIG. 16 is a diagram showing a format of a packet containing an IGMP message.
Figure 17:
FIG. 17 is a diagram showing a format of the packet containing an MLDv2 message.

The Report message is a control message based on an IGMP message or an MLDv2 message. FIGS. 16 and 17 are diagrams showing formats of the packet including the IGMP message and of the packet containing the MLDv2 message. An assumption in FIGS. 16 and 17 are that the data link layer is Ethernet. The IP packet retains the IGMP message as datagram of the IP packet. The IP packet also retains the MLDv2 message similarly as datagram of the IP packet.

Figure 18:
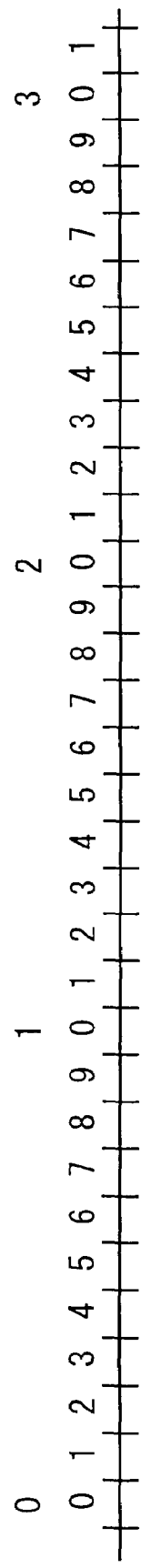
FIG. 18 is a diagram showing a header format of an IPv4 packet.
Figure 19:
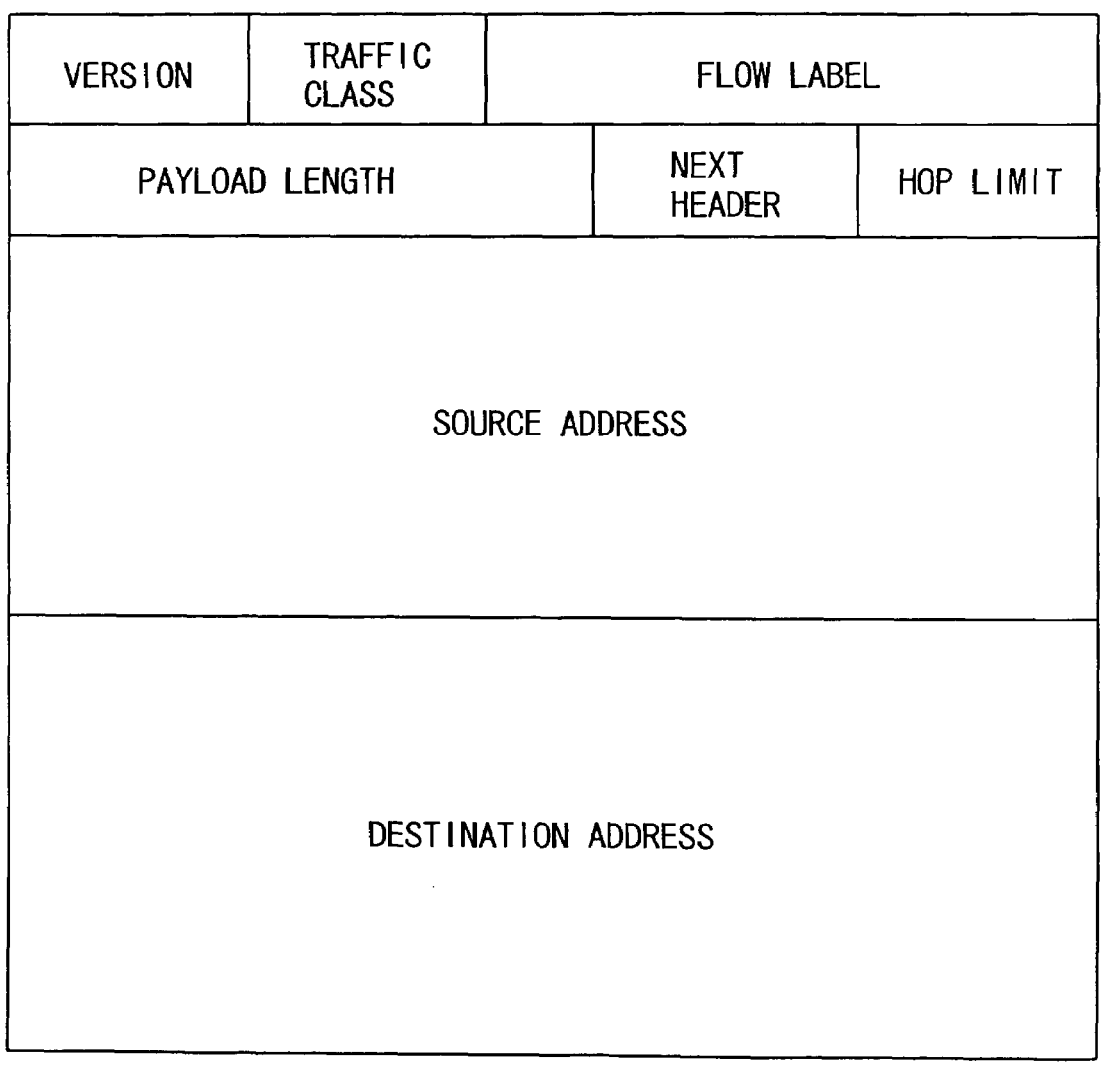
FIG. 19 is a diagram showing a header format of an IPv6 packet.

With respect to the Report message, an IP address is "224.0.0.22", a MAC address is "01:00:5E:00:00:16", a protocol number in the IP header is "2" representing the IGMP, and a type value of the IGMP message is "0x22". FIGS. 18 and 19 are diagrams showing header formats of an IPv4 packet and of an IPv6 packet. In a case where a value of Protocol ID in FIG. 18 is "2", the packet is judged to be a packet including the IGMP message. Therefore, based on these pieces of information, the multicast control message judging unit 25 judges whether or not the received packet includes the IGMP message and further whether or not it includes the Report message.

Figure 20:
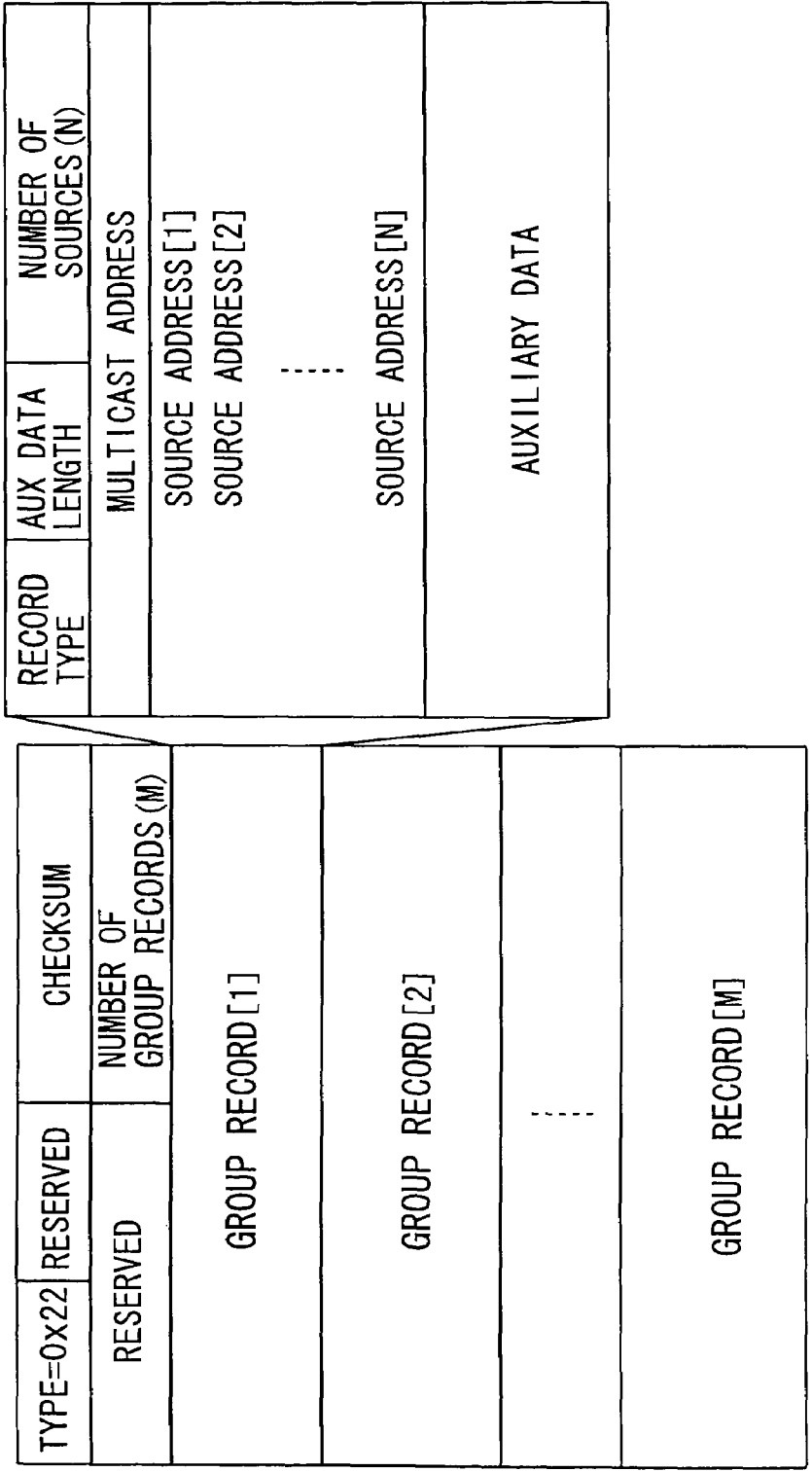
FIG. 20 is a diagram showing a format of a Report message on the IGMPv3.
Figure 21:
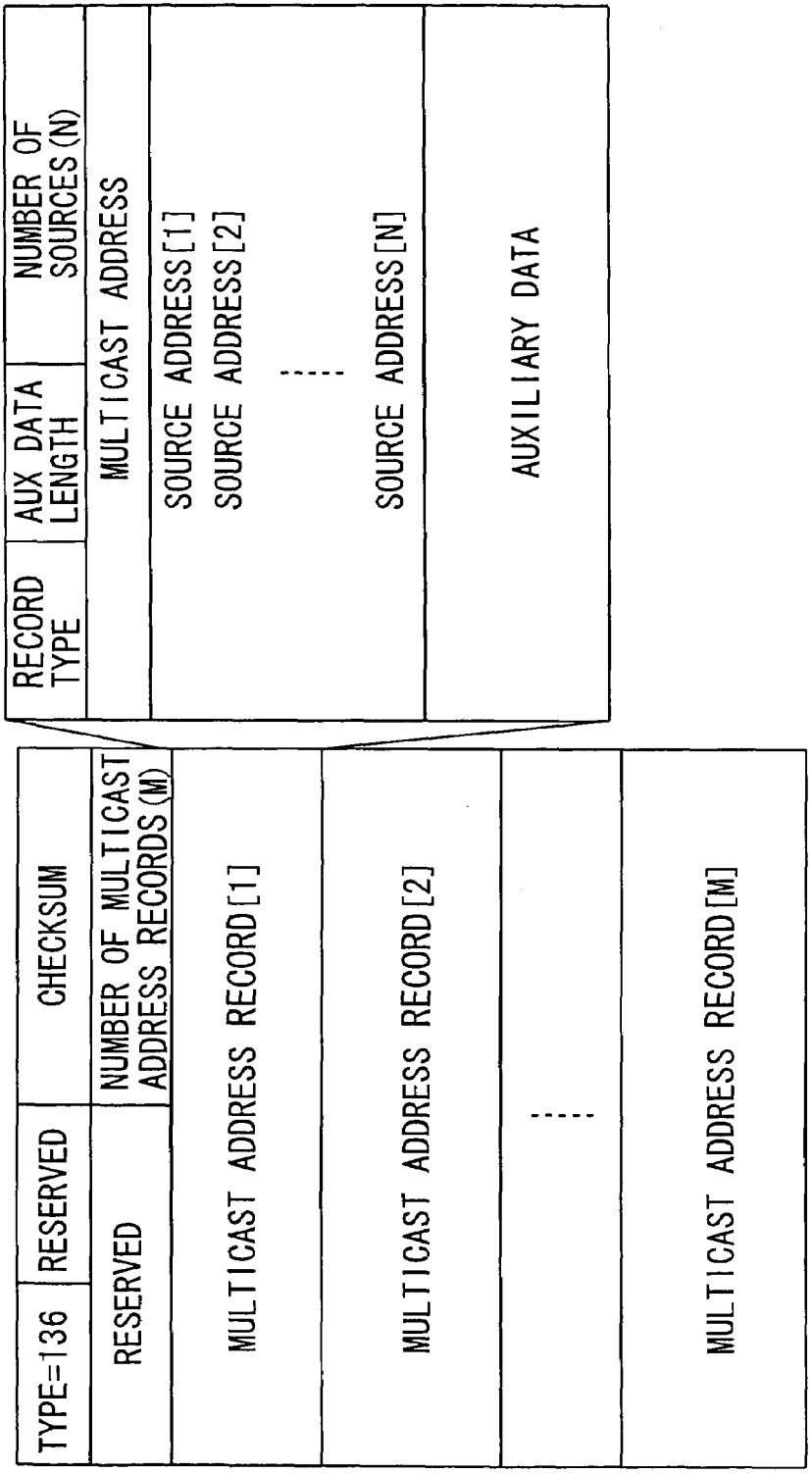
FIG. 21 is a diagram showing a format of a Report message on the IGMPv3.

FIGS. 20 and 21 are diagrams showing formats of the Report messages on the IGMPv3 and on the MLDv2. The Report message includes a multicast address (group address: Multicast Address) of the multicast data that the client 5 as a sender of the Report message desires to receive, a list (source list) of addresses (Source Address) of the servers 3 as transmission sources of the multicast data desired to be received, and a filter mode.

For example, a Report message implying that the multicast data having a multicast address of "238.0.1.12" are received from a source address of "162.22.36.5" and from a source address of "162.22.36.6", has the multicast address of "238.0.1.12", the source address of one of "162.22.36.5" and "162.22.36.6", and the filter mode of "INCLUDE".

Further, for instance, a Report message implying that the multicast data having a multicast address of "238.0.1.12" are received from other than the source of "162.22.36.5" and the source of "162.22.36.6"], has the multicast address of "238.0.1.12", the source addressor one of "162.22.36.5" and "162.22.36.6", and the filter mode of "EXCLUDE". The client 5 is capable of designating a plurality of multicast addresses in the single Report message, and further designating the list of source addresses for the respective multicast addresses and the corresponding filter mode.

The explanation of the Report message comes to an end, and there is a return to the description of the multicast control message judging unit 25. Next, an entry adding process executed by the multicast control message judging unit 25 will be described. The multicast control message judging unit 25, in the case of receiving the Report message from a new client 5 that is not recorded as an entry in the receipt client information management table 24A, generates a new entry based on information contained in the Report message. At this time, the multicast control message judging unit 25 identifies the new client 5 by comparing a source address of the packet including the Report message with a client address in the receipt client information management table 24A.

FIG. 22 is a diagram showing an example of the entry retained in the receipt client information management table 24A. For instance, in a state where the receipt client information management table 24A shown in FIG. 15 is retained, in the case of receiving the Report message from the client 5 whose IP address is "210.23.171.gg", a new entry shown in FIG. 22 is registered in the receipt client information management table 24A. At this time, it is premised that the Report message includes "xx:xx:xx:xx:45:67" as the MAC address of the client 5, "61.143.221.38" as the source address, "238.0.2.222" as the multicast address, and "INCLUDE" as the filter mode.

Next, an entry updating process executed by the multicast control message judging unit 25 will be explained. The multicast control message judging unit 25, in case contents of the Report message are different from contents of the entry in the receipt client information management table 24A, executes the entry updating process.

For instance, it is assumed that the Report message designating "EXCLUDE" as the filter mode, "61.143.221.2" as the source address and "238.0.0.123" as the multicast address be received from the client 5 whose address is "210.23.171.aa". In this case, the contents of the Report message are different from the contents of the receipt client information management table 24A. Accordingly, the multicast control message judging unit 25 updates the contents of the receipt client information management table 24A.

FIG. 23 is a diagram showing an example of the entry retained in the receipt client information management table 24A. In the case of receiving the Report message, the multicast control message judging unit 25 updates the contents of the entry number 1 into contents shown in FIG. 23. As a result of the updating, the multicast router 16 forwards the multicast data having the multicast address of "238.0.0.123" and sent from other than the server 3 of which the source address is "61.143.221.2", to the client 5 having the address of "210.23.171.aa".

Moreover, in the case of receiving a Report message that has the filter mode of "INCLUDE" and does not include the source address (empty), the multicast control message judging unit 25 deletes, from the entry, information including the multicast address included in the Report message. Namely, in the case of receiving such the Report message, the multicast control message judging unit 25 updates the entry so as not to forward the multicast data having the multicast address included in the Report message to the client 5 as the sender of the Report message.

For instance, it is assumed that a Report message including the multicast address of "238.225.13.33", the source address of being empty and the filter mode of "INCLUDE" be received from the client whose address is "210.23.171.bb". In this case, the multicast control message judging unit 25 judges that the forwarding of the multicast data having the multicast address of "238.225.13.33" to the client 5 be stopped (canceled). Namely, the multicast control message judging unit 25 deletes the information with the multicast address being "238.225.13.33" from the entry in which the client address is "210.23.171.bb". In the receipt client information management table 24A shown in FIG. 15, as a result, the entry given the entry number 2 is deleted. This process is executed similarly on the MLDv2 in the IPv6 environment.

Next, an operation of the multicast control message judging unit 25 in the IPv6 environment will be described. In an MLDv2-supported network in the IPv6 environment, the multicast control message judging unit 25 judges that a packet in which the MAC address is the multicast MAC address and is "33:33:00:00:00:22", a value in a next header field within the IP header is "58" and a type value within the header is "136 (a binary number)", is a packet including the Report message on the MLDv2. Therefore, in a case where the layer-2 switch 4 does not support the MLDv2 Snooping and even in an environment where the MLDv2 is applied in a sub-network subordinate to the multicast router 16, the multicast data can be forwarded to only the client 5 requiring the multicast data.

The multicast packet judging unit 26 is constructed by using a CPU, a RAM, and so on. The multicast packet judging unit 26 judges whether the packet received from the forwarding control unit 19 is the multicast packet or not. The multicast packet judging unit 26, in case the packet is the multicast packet, transfers the packet to the data frame generating unit 27.

While on the other hand, the multicast packet judging unit 26, in case the packet is not the multicast packet, sends the packet via the transmitting/receiving interface 21. An example of the type of packet is, in the normal unicast data and the multicast data such as a message on the multicast routing protocol, and so on.

The data frame generating unit 27 is constructed by use of a CPU, a RAM, and so on. The data frame generating unit 27 receives, from the multicast packet judging unit 26, the packet judged to be the multicast packet by the multicast packet judging unit 26. The data frame generating unit 27 refers to the multicast address and the source address (the address of the server 3 as the transmission source) in the multicast packet received. The data frame generating unit 27 reads, from the receipt client information management table 24A, an entry including the multicast address and the source address as reference results. The data frame generating unit 27 changes and copies the received multicast packet, thereby generating a unicast packet addressed to the client address (the client MAC address) in the readout entry. At this time, the data frame generating unit 27 changes the destination MAC address in the received multicast packet into the client MAC address included in the readout entry from the multicast MAC address. Then, the data frame generating unit 27 sends the generated unicast packet via the transmitting/receiving interface 21.

Figure 24:
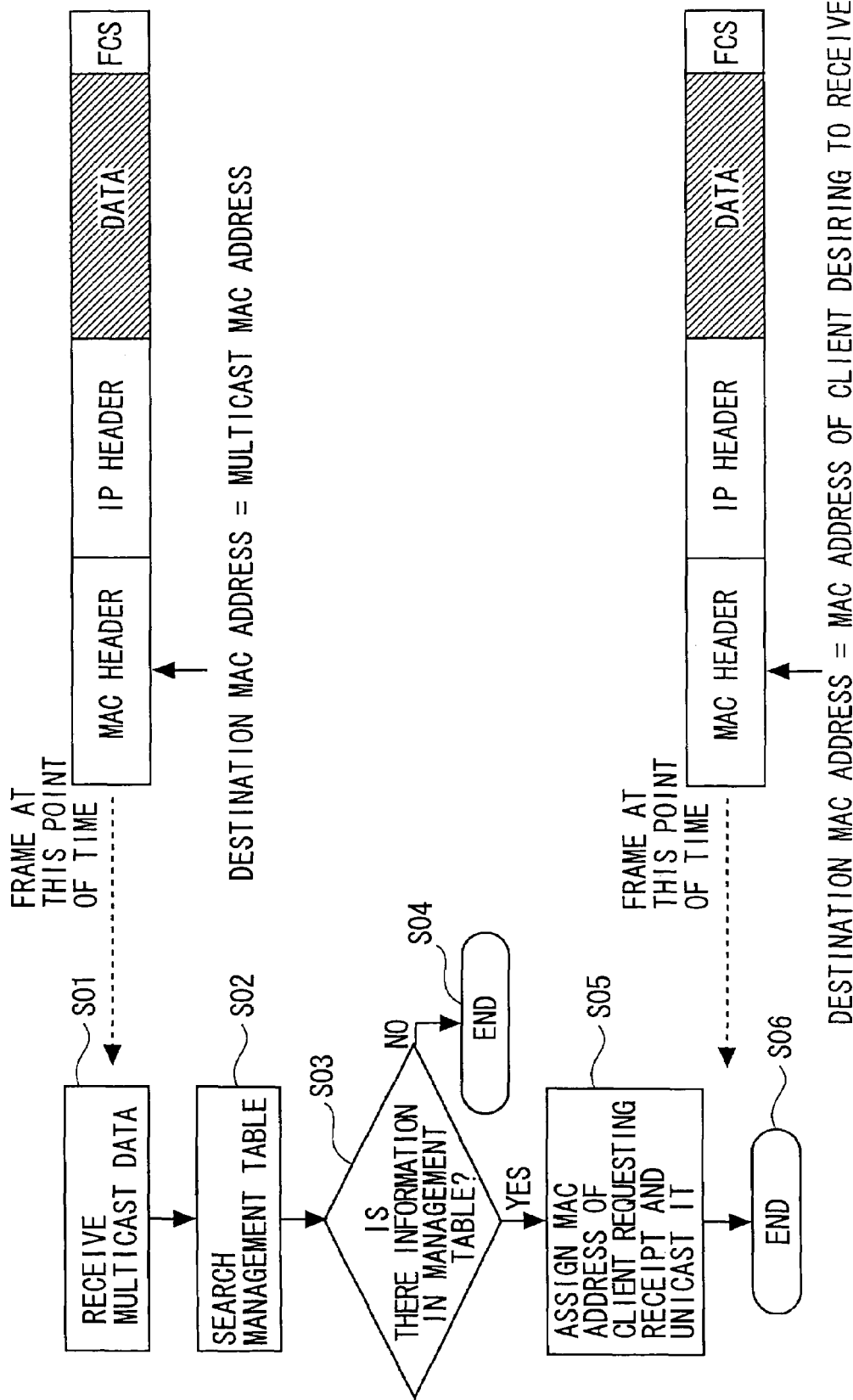
FIG. 24 is a flowchart showing an example of an operation of a data frame generating unit.

FIG. 24 is a flowchart showing an example of an operation of the data frame generating unit 27. The operation of the data frame generating unit 27 will be described by use of FIG. 24.

For example, in a case where the multicast router 16 receives the multicast data (the multicast address is "238.0.0.123") from the server 3 having the address of "61.143.221.2", the data frame generating unit 27 receives the piece of multicast data from the multicast packet judging unit 26 (S01).

The data frame generating unit 27 judges whether an entry related to the received multicast data exists in the receipt client information management table 24A or not. Namely, the data frame generating unit 27 searches the receipt client information management table 24A for the multicast address and the source address (an entry including the source address in the case of the filter mode being "INCLUDE", but an entry that does not include the source address in the case of the filter mode being "EXCLUDE") of the piece of multicast data (S02).

In case the receipt client information management table 24A has none of the entries related to the received multicast data (S03-NO), the data frame generating unit 27 sends the piece of multicast data in an intact state (i.e., the original multicast data) via the transmitting/receiving interface 21, and finishes the processing (S04).

While on the other hand, in case the receipt client information management table 24A has the entry related to the received multicast data (S03-YES), the data frame generating unit 27 unicasts the piece of multicast data to each client 5 making a request for receiving the piece of multicast data (S05).

In the example given above, the multicast address "238.0.0.123" of the received multicast data exists in the entry numbers 1 and 4 of the receipt client information management table 24A. Then, taking the filter mode and the source address into consideration, as a result, the data frame generating unit 27 judges that the received multicast data should be forwarded to the client 5 relevant to the entry number 1. Therefore, the received multicast data are unicast to the client 5 relevant to the entry number 1.

Concretely, the data frame generating unit 27 confirms the relevant entry and reads the client MAC address included in the entry. Namely, in FIG. 15, the data frame generating unit 27 reads "xx:xx:xx:xx:12:34". Next, the data frame generating unit 27 generates unicast data by setting the readout client MAC address to the destination MAC address of the received multicast data. At this time, the data frame generating unit 27, when reads a plurality of client MAC addresses, generates the same number of pieces of unicast data as the number of readout client MAC addresses by copying the received multicast data. In the example described above, one client MAC address is read out. Hence, the data frame generating unit 27 copies one piece of multicast data and executes changing the MAC addressing order to generate the unicast data. The data frame generating unit 27 transmits the generated unicast data via the transmitting/receiving interface 21. Then, the data frame generating unit 27 transmits the piece of multicast data in an intact state (i.e., the original multicast data) via the transmitting/receiving interface 21, and finishes the process (S06).

Figure 25:
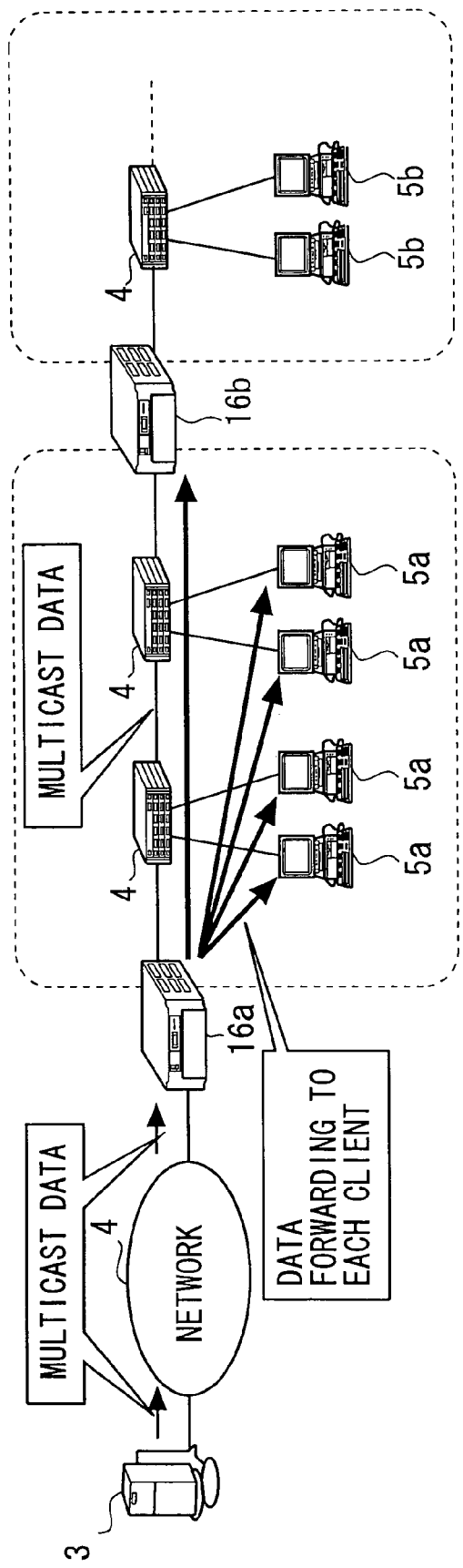
FIG. 25 is a view for explaining showing a function of an original multicast data transmitting process.

As described above, the data frame generating unit 27, irrespective of whether the process of forwarding the unicast data is executed or not, transmits the original multicast data. FIG. 25 shows a view for explaining an operation of the process of transmitting the original multicast data. In FIG. 25, a multicast router 16b is connected to a multicast router 16a located upstream through the layer-2 switch 4. The multicast router 16b needs the original multicast data in order to correctly distribute the multicast data to the client 5b connected subordinately. Therefore, the data frame generating unit 27 of the multicast router 16a, irrespective of whether the process of forwarding the unicast data is executed or not, transmits the original multicast data. Normally, the layer-2switch 4 forwards the multicast packet inputted from a certain port, via a port (e.g., a port which the multicast router 16b is connected to) accommodated the multicast router or a port in a direction that the multicast router exists. Hence, the original multicast data are transmitted to other multicast router (the multicast router 16b).

The transmitting/receiving interface 21 transmits and receives the data to/from other device via the network. The transmitting/receiving interface 21a transmits and receives the data to/from the server 3 via the network (the multicast-supported network 6). Each of the transmitting/receiving interfaces 21b and 21c transmits and receives the data to/from one of the client 5 and other multicast router 16 through the sub-network and the layer-2switch 4.

The forwarding control unit 19 executes a routing process included in a normal router and a multicast routing process. Therefore, the forward processing unit 19 has a routing table storage unit 20 stored with a routing table 20A, and a multicast processing unit 22 for executing the multicast routing process.

[Operation/Effect]

According to the multicast router 16 of the invention, the receipt client information management table 24A retains the receipt setting of the multicast data for each client 5 on the basis of the IGMPv3 message. Then, the data frame generating unit 27, based on the contents of the receipt client information management table 24A, unicasts the received multicast data as the unicast data to the client 5 set to receive the multicast data.

Hence, the layer-2 switch 4 installed or placed between the multicast router 16 and the client 5, is capable of forwarding the unicast data transmitted from the multicast router 16 on the basis of the layer-2, information. Namely, the layer-2switch 4 becomes to have no necessity of executing the process based on the IGMPv3, which requires the layer-3 level processing. Accordingly, the layer-2switch 4 does not need implementing the IGMPv3-supported Snooping that causes a decline of forwarding ability. Hence, it is possible to reduce a cost for implementing the IGMPv3-supported Snooping and to prevent the decline of the forwarding ability.

In other words, the layer-2 switch 4 existing downstream of the multicast router 16, by the switching operation based on the layer 2, can forward the multicast data to only one or more clients 5, desiring to receive the multicast data, within one or more clients 5 accommodated in the layer-2 switch 4.

Further, the data frame generating unit 27, regardless of whether or not the multicast data are forwarded as the unicast data, invariably forwards the original multicast data. Therefore, it is feasible to forward the original multicast data to other multicast routers 16 installed or placed subordinately to the multicast router 16. Accordingly, other multicast routers 16 can correctly forward, based on the original multicast data, the unicast data to each of the plurality of clients 5 installed subordinately to each of the other multicast routers 16.

Further, the timer 23 deletes, from the receipt client information management table 24A, the entry related to the client 5 corresponding to the entry with the timeout occurred. Therefore, in case the client 5 is unable to receive the multicast data due to an occurrence of problems or troubles (e.g., a sudden stop of the power supply, a hang-up (freeze) of the OS, and so on), the forwarding of the multicast data to the client 5 is stopped. Accordingly, a network bandwidth can be prevented from being wasted. Namely, it is feasible to prevent an useless process of forwarding the multicast data from being executed.

Modified Embodiment

The two pieces of transmitting/receiving interfaces 21 (the transmitting/receiving interfaces 21b and 21c) are provided on the side of the client, however, there may be constructed so that three or more interfaces or only one interface are to be provided without being limited to two.

Further, the multicast packet processing unit 18 is provided per transmitting/receiving interface 21, however, there may be also constructed to provide one single multicast packet processing unit 18 for managing all the transmitting/receiving interfaces.

Moreover, the data frame generating unit 27 may be constructed to read the client MAC address in whatever judging procedures.

Still further, the multicast control message judging unit 25 may be constructed to, in the case of receiving the Report message and the Query message corresponding to the IGMPv1 or the IGMPv2, convert the receipt client information management table 24A so as to support the IGMPv1 or IGMPv2. Then, the data frame generating unit 27 generates the unicast data corresponding to the multicast data by referring to the converted receipt client information management table 24A, and transmits the unicast data. Namely, in this case, the multicast packet processing unit 18 including the data frame generating unit 27 operates corresponding to the IGMPv1 or IGMPv2.

The multicast router is constructed by implementing configurations and functions of the forwarding device relating to the present invention to one of the general multicast router and the layer-3 switch for respectively executing the IP-level routing process. It may be, however, available to implement the configurations and functions of the forwarding device of the invention as a dedicated device.

Figure 26:
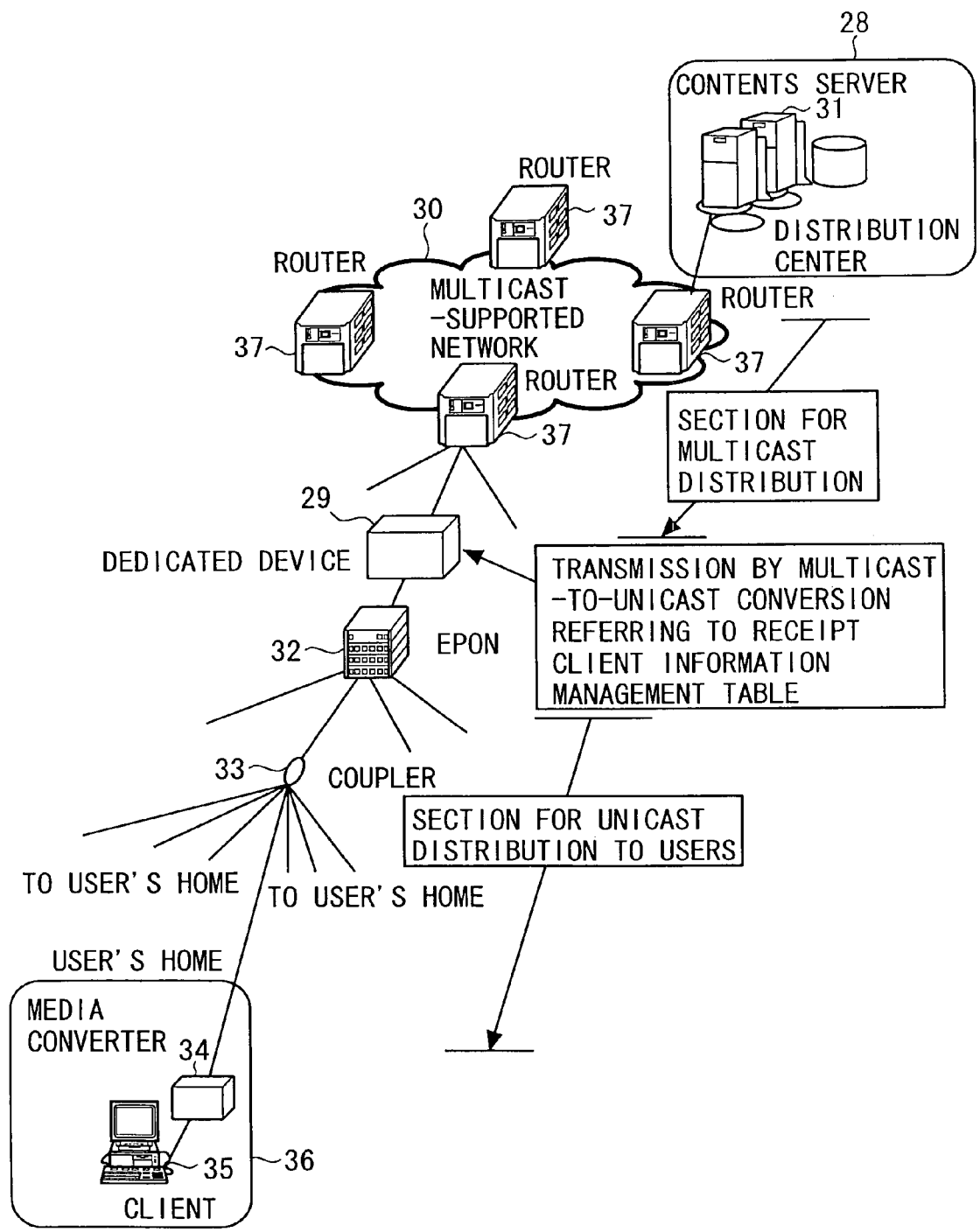
FIG. 26 is a view showing an example of a structure of a network where a dedicated device is used.

FIG. 26 shows an example of a network structure in the case of implementing configurations and functions of the forwarding device of the invention as a dedicated device 29. This network is configured by use of a distribution center 28, the dedicated device 29, an EPON (Ethernet Passive Optical Network) 32, a coupler 33 and a user's home 36. A contents server 31 is installed within the distribution center 28. Further, a media converter 34 and a client 35 are installed in the user's home 36. Moreover, the dedicated device 29 is installed between a router 37 connected to a multicast-supported network 30 and the client 35.

The dedicated device 29 refers to IGMP messages transmitted from the router 37 and the client 35 and generates the receipt client information management table 24A (see FIG. 15). Furthermore, the dedicated device 29 receives the multicast data from the router 37, generates the unicast data at the data frame generating unit 27 on the basis of the receipt client information management table 24A, and transmits the unicast data to the client 35.

The dedicated device 29 is thus installed. Thereby, there is no necessity to prepare a new multicast router 16 implemented the forwarding device of the invention, and it enable to use the existent equipment such as the router 37 and so on. For instance, even in a case where the router 37 does not support the IGMPv3, it is possible to make the router 37 support the IGMPv3 by upgrading the software, and so on. Therefore, with respect to the network only supporting the IGMPv1 and IGMPv2, it is possible to configure an IGMPv3-supported network by installing the dedicated device 29 and upgrading the software, thereby, it is able to reduce costs expended for constructing the network.

Further, in FTTH (Fiber To The Home), in terms of a property of the EPON32, the media converter 34 must implement the function of the IGMP Snooping. Normally, however, it is difficult to implement the forwarding device of the present invention, because the media converter 34 is small and does not include the CPU. In such a case, the dedicated device 29 is installed as illustrated in FIG. 26, whereby the IGMPv3-based multicast becomes possible without exerting any influence upon other systems.

APPLIED EXAMPLES

Figure 27:
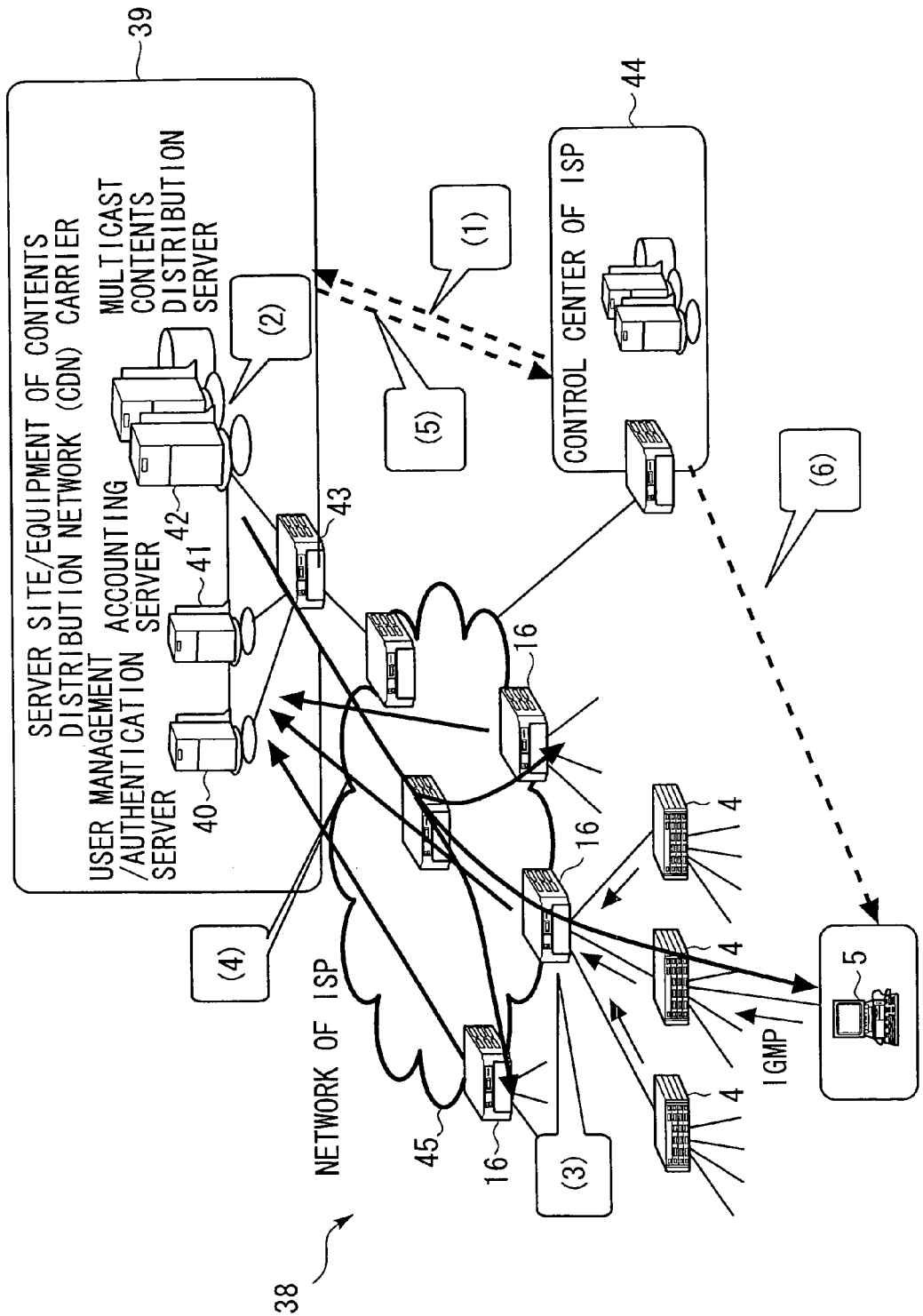
FIG. 27 is a view showing an outline of a contents distribution system.

The forwarding device (such as the multicast router 16 implemented the forwarding device, the dedicated device 29, and the like) of the invention is applied to a contents distribution system, thereby exhibiting new effects. FIG. 27 shows an outline of a contents distribution system 38 to which the multicast router 16 is applied. The content distributions system 38 is configured by use of a server site 39 of a contents distribution network (CDN) carrier, a control center 44 of an ISP (Internet Service Provider), a network 45 of the ISP (multicast-supported network), the multicast router 16, the clients 5 and the layer-2 switch 4. The server site 39 is configured by using a user management/authentication server 40, an accounting server 41, a multicast contents distribution server 42 and a router 43. Further, the ISP network 45 includes the multicast router 16. Moreover, the layer-2 switch 4 is connected to the ISP network 45 via the multicast router 16.

In the contents distribution system 38 illustrated in FIG. 27, a content distribution request/contract is made between the CDN carrier and the ISP (1). Thereafter, the multicast contents distribution server 42 of the CDN carrier performs multicast distributing contents (2). The multicast router 16 collects, retains and manages the receipt client information (3), and transmits the receipt client information to the site of the CDN carrier (4). The CDN carrier having received the receipt client information notifies the contract-established ISP of the received user information and accounting information (5). Then, the ISP claims the user for charges corresponding to receiving condition of the contents (6).

The user management/authentication server 40 is stored with a user management table 46. The user management/authentication server 40 creates and updates the user management table 46 on the basis of the client information from the multicast router 16 installed in the ISP network 45. The client information includes pieces of information retained in the receipt client information management table 24A.

FIG. 28 is a diagram showing an example of the user management table 46. The user management table 46 has field items such as a user name, a user address (client address), an address of received contents (multicast address), a start time of reception, and an end time of reception.

The user name represents a name of the user of the client 5. The user name is used for identifying the user and may therefore be replaced by a user's ID, and the like.

The user address is an address assigned to the client 5 and corresponds to the client address in the receipt client information management table 24A. The user address may be mapping to the client MAC address in the receipt client information management table 24A. Further, the mapping (correspondence) between the user name and the user address becomes possible by referring to log information of a DHCP (Dynamic Host Configuration Protocol) server of the ISP and by making the user management/authentication server 40 and the DHCP server cooperate.

The receipt content address (the address of the received contents) is a multicast address of the contents received by the client 5 and corresponds to the multicast address in the receipt client information management table 24A. At this time, the client 5 receives the multicast data as contents distributed by the multicast contents distribution server 42.

The start-of-receiving time (the start time of reception) represents a time when the client 5 starts receiving the multicast data with respect to the corresponding multicast address. The end-of-receiving time (the end time of reception) represents a time when the client 5 finishes receiving the multicast data with respect to the corresponding multicast address.

Figure 29:
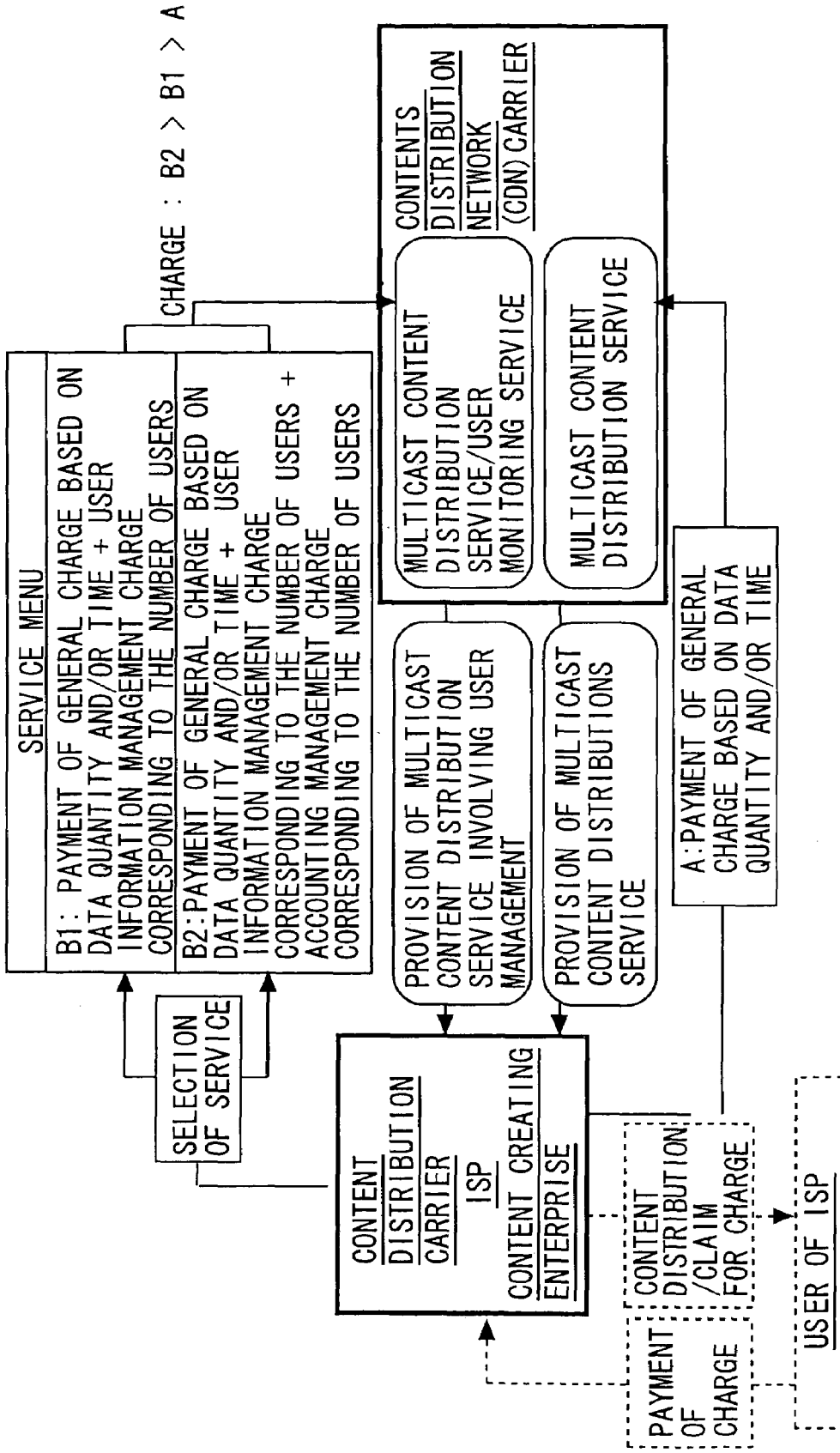
FIG. 29 is a diagram showing an example of a service performed based on information in the user management table.

The CDN carrier can provide services on the basis of the information stored in the user management table 46. FIG. 29 is a diagram showing an example of the services performed based on the information in the user management table 46.

In FIG. 29, the CDN carrier performs the services. The CDN carrier conducts a business for providing a contents distribution system oriented contract-users such as a contents creating company, the ISP, and the like. It is particularly herein assumed that the CDN carrier is to provide the contents distribution system based on the multicast system.

The CDN carrier sets a service for distributing the contents by normal multicasting, and a service including user management in addition to the multicast-based content distribution. At this time, in the service including the user management, the service based on information retained in the user management table 46 is provided. For example, the CDN carrier provides, based on the user management table 46, the content creating company and the ISP with receipt contents, a receipt time thereof, etc. of each user.

In the conventional multicast, the server executes only the process of simply attaching the multicast address to the data of the contents and transmitting it. Further, the conventional multicast used UDP (User Datagram Protocol), and hence, unlike the case where TCP (Transmission Control Protocol) is utilized, it was basically impossible to grasp which client receives the multicast data and which multicast data is received. Accordingly, in the conventional multicast-based content distribution, it was impossible to grasp the user management and conditions of watching and listening to the contents.

The information provided by the CDN carrier, however, enables the contents creating company and the ISP to grasp the user management and the contents watching/listening conditions, and time-based charging per user, a calculation of an audience rating, and the like can be carried out.

Note that these services may also be provided not by the CDN carrier but by the ISP itself. Further, this service may also be conducted in such a form that the CDN carrier provides the network system itself and surrogates to distribute the content created by the content creating company.

According to the invention, in the network utilizing the multicast management protocol involving the use of the information of a layer of an unspecified or higher order (e.g., the layer 3), the switching device distributes the multicast data to only the port which the client desiring to receive the multicast data is connected to, without making any change in the switching device of a layer of a lower order (e.g., the layer 2) than the unspecified layer.

What is claimed is:

1. A data generating device comprising:
   a reading unit to read out forward management information relating to a forwarding process of multicast data to be containing a multicast address as a destination address of a first layer from data of a second layer higher than the first layer, wherein each of the first layer and the second layer is one of layers defined on an OSI model;
   a storage unit to store the forward management information read by the reading unit;
   a data generating unit to identify one or more clients, each of which desires to receive multicast data and corresponds to a forward destination of the multicast data, based on the forward management information stored in the storage unit, to generate a same number of copies of the multicast data as a number of identified clients~ and to convert the destination address of the first layer of each copy of the multicast data being the multicast address into a first layer address of a corresponding one of the identified clients so that a switching device accommodating the identified one or more clients receives each copy of the multicast data converted the destination address of the first layer to forward each copy of the multicast data to the identified one or more clients based on data of the first layer of each copy of the multicast data; and
   a forwarding unit to forward each copy of the multicast data converted the destination address of the first layer and generated by the data generating unit to the switching device.

2. A data generating device according to claim 1, wherein said data generating unit determines one or more clients, each of which corresponds to the forward destination, based on the data of the second layer in the multicast data.

3. A data generating device comprising:
   a reading unit to read out information relating to a forwarding process of multicast data including a multicast MAC address as a MAC destination address of a layer 2 defined on an OSI layer model from data of a layer higher than the layer 2;
   a storage unit to store forward management information based on the information read by said reading unit; and
   a data generating unit to identify, based on the forward management information stored in the storage unit, one or more clients, each of which corresponds to a forward destination of the multicast data, to generate a same number of copies of the received multicast data as a number of identified clients to be forwarding destinations, and to convert the MAC destination address of each copy of the multicast data being the multicast MAC address into a unicast MAC address of a corresponding one of the identified clients as a destination address of the layer 2 of the data so that a switching device accommodating the identified one or more clients receives each copy of the multicast data converted the MAC destination address to forward each copy of the multicast data to the identified one or more clients based on data of the layer 2 of each copy of the multicast data.

4. A data generating device according to claim 3, wherein said data generating unit determines one or more clients, each of which corresponds to the forward destination, based on the data of the layer higher than the layer 2 in the multicast data.

5. A data generating device according to claim 3, further comprising:
   Sending unit to send each copy of multicast data converted the MAC destination address and generated by said data generating unit and the received multicast data toward a downstream side.

6. A data generating device according to claim 3, further comprising managing unit to update the forward management information stored in said storage unit on the basis of the information read by said reading unit.

7. A data generating device according to claim 6, wherein in case the information read by said reading unit is participation information indicating a participation in a multicast group, said managing unit reflects contents of the participation information to the forward management information stored in said storage unit.

8. A data generating device according to claim 7, wherein in case the information read by the reading unit is leaving information that indicates leaving from the multicast group, the managing unit deletes information relating to the client as a sender of the leaving information from the forward management information.

9. A data generating device according to claim 7, further comprising time measuring unit to measure a fixed period of time,
   wherein in case the time measuring unit judges that a response to a response request is not received for the fixed period of time or longer from the client, the managing unit deletes information relating to this client from the forward management information.

10. A data generating device according to claim 3, wherein said reading unit reads the information from a message of Internet group management protocol version 3.

11. A data generating device according to claim 3, wherein said reading unit reads the information from a message of multicast listener discovery version 2.

12. A data generating device according to claim 3, wherein said managing unit, when a message of internet group management protocol version 1 or version 2 is received, changes the forward management information on the basis of specifications of the internet group management protocol version 1 or version 2.

13. A data generating device according to claim 3, wherein said storage unit stores the forward management information including correspondence between an address of the client to which multicast data should be forwarded and a destination address of the multicast data.

14. A data generating device according to claim 13, wherein said storage unit stores the forward management information further including a source address of the multicast data.

15. A data generating device according to claim 8, wherein said storage unit stores the forward management information including correspondence between an address of the client to which multicast data should be forwarded and a destination address of the multicast data, and the data generating device further comprises client management information storage unit to store client management information based on the forward management information, wherein the client management information include a client identifier indicating the client to which the multicast data should be forwarded, a destination identifier indicating a transmission destination of the multicast data, a time when relationship between the client and the transmission destination of the multicast data have been stored in the forward management information, and a time when the relationship have been deleted from the forward management information.

16. A data generating device according to claim 8, wherein said storage unit stores the forward management information including correspondence between an address of the client to which the multicast data should be forwarded, a destination address of the multicast data and a source address of the multicast data, and the data generating device further comprises client management information storage unit to store client management information based on the forward management information, wherein the client management information include a client identifier indicating the client to which the multicast data should be forwarded, a destination identifier indicating a transmission destination of the multicast data, a source identifier indicating a transmission source of the multicast data, a time when relationship between the client and the transmission destination of the multicast data have been stored in the forward management information, and a time when the relationship have been deleted from the forward management information.

17. A data generating device comprising:
a storage unit to store data relating to one or more clients desiring to receive multicast data to be forwarded to one or more clients based on a protocol of a first layer, wherein the multicast data includes an multicast address as an destination address of a second layer lower than the first layer, and each of the first layer and the second layer is one of layers defined on an OSI model; and
a data generating unit to generate, when accepts the multicast data, copies of the multicast data per client to be forwarded thereto based on a protocol of the second layer, the multicast data by changing to convert the destination address of the second layer of each copy of the multicast data being the multicast address into an address of the client desiring to receive the multicast data, on the basis of the data relating to one or more clients that have been stored in said storage unit, and to give the copies of the multicast data per client to a sending unit to send the each copy of the multicast data toward one or more second layer switches accommodating one or more clients so that one or more second layer switches device receive each copy of the multicast data converted the destination address of the second layer to forward each copy of the multicast data to one or more clients based on data of the second aver of each copy of the multicast data.

18. A data generating method executed by an information processing device, comprising:
reading forward management information on a forwarding process of multicast data to be containing a multicast address as a destination address of a first layer from data of a second layer higher than the first layer, wherein each of the first layer and the second layer is one of layers defined on an OSI model;
identifying one or more clients, each of which desires to receive multicast data and corresponds to a forward destination of the multicast data based on of the forward management information;
generating a same number of copies of multicast data as a number of identified clients;
converting the destination address of the first layer of each copy of the multicast data being the multicast address into an first layer address of a corresponding one of the identified clients so that a switching device accommodating the identified one or more clients receives each copy of the multicast data converted the destination address of the first layer to forward each copy of the multicast data to the identified one or more clients based on data of the first layer of each copy of the multicast data; and
forwarding each of the pieces of transmission copy the multicast data converted the destination address of the first layer to the switching device.

19. A data generating method comprising:
reading information relating to a forwarding process of multicast data including a multicast MAC address as a MAC destination address of layer 2 defined on an OSI layer model from data of a layer higher than the layer 2;
storing forward management information based on the readout information;
identifying, based on the stored forward management information, one or more clients, each of which corresponds to a forward destination of the multicast data;
generating, from the multicast data, a same number of copies of the received multicast data as a number of identified clients to be forwarding destinations; and
converting the MAC destination address of each copy of the multicast data being the multicast MAC address into an unicast MAC address of a corresponding one of the identified clients as a destination address of the layer 2 of the data so that a switching device accommodating the identified one or more clients receives each copy of the multicast data converted the MAC destination address to forward each copy of the multicast data to the identified one or more clients based on data of the layer 2 of each copy of the multicast data.

* * * * *

UNITED STATES PATENT AND TRADEMARK OFFICE
CERTIFICATE OF CORRECTION

| | | |
|---|---|---|
| PATENT NO. | : 7,627,690 B2 | |
| APPLICATION NO. | : 10/771724 | |
| DATED | : December 1, 2009 | |
| INVENTOR(S) | : Naofumi Kobayashi | |

It is certified that error appears in the above-identified patent and that said Letters Patent is hereby corrected as shown below:

Column 27, line 57: "a number of indentified clients~and" should be changed to --a number of indentified clients, and--.

Column 28, lines 39-40: "comprising: Sending unit to send each copy of multicast data" should be changed to --comprising sending unit to send each copy of the multicast data--.

Column 29, lines 35-36: "stored in ... the forward management information," should be changed to --stored in the forward management information,--.

Column 30, line 1: "layer, the multicast data by changing to convert the" should be changed to --layer, to convert the--; line 14, "the second aver of each copy of" should be changed to --the second layer of each copy of--; line 26, "the multicast data based on of the forward" should be changed to --the multicast data based on the forward--; and line 40, "forwarding each of the pieces of transmission copy the" should be changed to --forwarding each copy of the--.

Signed and Sealed this

Fifteenth Day of February, 2011

David J. Kappos
*Director of the United States Patent and Trademark Office*